United States Patent
Yang et al.

(10) Patent No.: US 10,444,072 B2
(45) Date of Patent: Oct. 15, 2019

(54) OPTICAL SENSOR, SENSOR ARRANGEMENT AND METHOD FOR SENSING

(71) Applicant: Nanyang Technological University, Singapore (SG)

(72) Inventors: Yaowen Yang, Singapore (SG); Muneesh Maheshwari, Singapore (SG); Swee Chuan Tjln, Singapore (SG); Tanmay Chaturvedi, Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 15/923,609

(22) Filed: Mar. 16, 2018

(65) Prior Publication Data
US 2018/0274979 A1 Sep. 27, 2018

(30) Foreign Application Priority Data
Mar. 21, 2017 (SG) ............................. 10201702262

(51) Int. Cl.
*G01J 3/18* (2006.01)
*G01K 11/32* (2006.01)
(Continued)

(52) U.S. Cl.
CPC .......... *G01J 3/1895* (2013.01); *G01B 11/161* (2013.01); *G01B 11/18* (2013.01);
(Continued)

(58) Field of Classification Search
CPC ..... G01J 3/1895; G01J 3/4531; G01B 11/161; G01K 11/3206
(Continued)

(56) References Cited

U.S. PATENT DOCUMENTS

| 6,018,160 A * | 1/2000 | Bennion ................ G01B 11/16 250/227.14 |
| 2003/0141440 A1 | 7/2003 | Kim et al. |

(Continued)

FOREIGN PATENT DOCUMENTS

CN 102589617 A 7/2012

OTHER PUBLICATIONS

Leng, Non-destructive evaluation of smart materials by using extrinsic Fabry-Perot interferometric and fiber Bragg grating sensors, NDT&E International 35 USC (2002) pp. 273-276.
(Continued)

*Primary Examiner* — Jerry M Blevins
(74) *Attorney, Agent, or Firm* — Kilpatrick Townsend & Stockton LLP

(57) ABSTRACT

Various embodiments provide an optical sensor having an optical source, a grating arrangement optically coupled to the optical source to receive a source optical signal from the optical source, the grating arrangement including a chirped FBG having a defined spectral profile, wherein, in response to a first change in at least one parameter interacting with the chirped FBG, the defined spectral profile is shifted in a first direction relative to a reference spectral profile, and the grating arrangement is configured, in response thereto, to generate a first output optical signal corresponding to the first change, and wherein, in response to a second change in the at least one parameter interacting with the chirped FBG, the defined spectral profile is shifted in a second direction relative to the reference spectral profile, and the grating arrangement is configured, in response thereto, to generate a second output optical signal corresponding to the second change.

12 Claims, 10 Drawing Sheets

(51) Int. Cl.
  *G01B 11/16* (2006.01)
  *G01J 3/453* (2006.01)
  *G01D 5/353* (2006.01)

(52) U.S. Cl.
  CPC ........ *G01D 5/35316* (2013.01); *G01J 3/4531* (2013.01); *G01K 11/3206* (2013.01); *Y02B 10/30* (2013.01)

(58) Field of Classification Search
  USPC .......................................................... 385/12
  See application file for complete search history.

(56) References Cited

U.S. PATENT DOCUMENTS

| | | | |
|---|---|---|---|
| 2005/0259697 | A1 | 11/2005 | Han et al. |
| 2016/0123715 | A1* | 5/2016 | Froggatt ............ G01D 5/35316 356/477 |
| 2017/0108375 | A1* | 4/2017 | Brueck ..................... G01J 1/06 |

OTHER PUBLICATIONS

Chan, Fiber Bragg grating sensors for structural health monitoring of Tsing Ma bridge: Background and experimental observation, Engineering Structures 28 (2006), pp. 648-659.

Wang, Determination of Load-Strain Characteristics of Concrete Slabs by Using Embedded Fiber Bragg Grating Sensors, Proceedings of SPIE vol. 4073 (2000), pp. 297-304.

Farahi, Simultaneous Measurement of Temperature and Strain: Cross-Sensitivity Considerations, Journal of Lightwave Technology, vol. 8, No. 2, Feb. 1990, pp. 128-142.

Hocker, Fiber-optic sensing of pressure and temperature, Honeywell Corprate Material Sciences Center, Dec. 26, 1978, four pages.

Xu, Optical In-Fibre Grating High Pressure Sensor, Electronics Letters, Feb. 18, 1993, vol. 29, No. 4, pp. 398-399.

Davis, Matched-filter interrogation technique for fibre Bragg grating arrays, Electronics Letters, May 11, 1995, vol. 31, No. 10, pp. 822-823.

Kersey, Multiplexed fiber Bragg grating strain-sensor system with a fiber Fabry-Perot wavelength filter, Optics Letters, vol. 18, No. 16, Aug. 15, 1993, pp. 1370-1372.

Melle, A Passive Wavelength Demodulation System for Guided-Wave Bragg Grating Sensors, IEEE Photonics Technology Letters, vol. 4, No. 5, May 1992, pp. 516-518.

Fallon, Multiple-strain-sensor interrogation with an asymmetric grating, Thursday Afternoon, Cleo'98, pp. 423-424.

Fallon, All-fibre optical sensing system: Bragg grating sensor interrogated by a long-period grating, Meas. Sci. Technol. 9 (1998) pp. 1969-1973.

Kim, Fiber Bragg Grating Strain Sensor Demodulator Uwsing a Chirped Fiber Grating, IEEE Photonics Technology Letters, vol. 13, No. 8, Aug. 2001, pp. 839-841.

Chtcherbakov, Chirped Fiber-Optic Bragg Grating Interrogator in a Multiplexed Bragg Grating Sensor Configuration, Journal of Lightwave Technology, vol. 22, No. 6, Jun. 2004, pp. 1543-1547.

Zhao, Fiber Bragg Grating Sensor Interrogation Using Chirped Fiber Grating-Based Sagnac Loop, IEEE Sensors Journal, vol. 3, No. 6, Dec. 2003, pp. 734-738.

Fallon, Identical broadband chirped grating interrogation technique for temperature and strain sensing, IEE 1997, Electronics Letters Online No. 19970461, three pages.

Maheshwari, Wavelength-shifted chirped FBGs for temperature compensated strain measurement, Sensors and Actuators A: Physical, A 265 (2017) pp. 231-235.

Maheshwari, Structural Health Monitoring by Fiber Optic Polarimetric Sensors (FOPS) and Fiber Bragg Grating (FBG), Thesis May 24, 2016, 188 pages.

International Search Report and Written Opinion dated Nov. 2, 2018 for International Patent Application No. PCT/SG2018/050358 filed Jul. 20, 2018, all pages.

* cited by examiner

OPTICAL SENSOR, SENSOR ARRANGEMENT AND METHOD FOR SENSING

CROSS-REFERENCE TO RELATED APPLICATION

This application claims the benefit of priority of Singapore patent application No. 10201702262X, filed 21 Mar. 2017, the content of it being hereby incorporated by reference in its entirety for all purposes.

TECHNICAL FIELD

Various embodiments relate to an optical sensor, a sensor arrangement and a method for sensing.

BACKGROUND

Fiber Bragg Grating (FBG) sensors are used in a variety of applications ranging from damage detection in composites to dynamic structural strain monitoring to long-term strain monitoring in the construction industry. FBGs are also used as temperature sensors, pressure sensors, etc., with a very high measurement accuracy. Despite being highly sensitive and accurate, the applications of FBG sensors are limited. The most genuine problem that FBGs face is the bulkiness and cost of its interrogation system, which is the optical spectrum analyzer (OSA). These problems limit the application areas of FBGs.

Several FBG interrogation designs have been proposed which rule out OSA, but they are only partially promising. A matched-filter interrogation has been demonstrated for strain measurement. Identical gratings are used as notch filters in this system. These notch filters are mounted on small stretching devices driven by piezoelectric (PZ) stacks which make this technique complicated and limits the strain measurement range to ±200µε. Mechanical strain amplification is needed to expand the measurement range, which makes the system even more complicated. An FBG demodulation system utilizing tunable Fabry-Perot wavelength filter has also been developed. Again, a piezoelectric transducer is used to adjust the cavity spacing in the Fabry-Perot wavelength filter. It makes the system complicated and dependent on the performance of an electrical component, like a piezoelectric transducer. Further, a passive wavelength demodulation system has been demonstrated which uses a commercial infrared high pass filter. The resolution of this system is very poor (around 400µε). One other known system employs an asymmetric grating as a wavelength-to-amplitude converter for linear sensing structures. The asymmetric grating employed in this technique is difficult to fabricate. In another low-cost FBG interrogation system, a long period grating (LPG) has been used as an edge filter converting strain-induced wavelength variation into optical power measurement. The LPGs are extremely sensitive to external perturbations such as temperature, strain, etc., which makes this interrogation system unsuitable for external applications. Moreover, the LPGs are known for their very high sensitivity to the refractive index of the surrounding medium.

There is also an FBG demodulation method using UV-induced birefringence of the optical fiber. To interrogate the wavelength shift in the FBG, the demodulator uses the wavelength-dependent travel-length of the reflected light from a chirped fiber grating. This method requires a few other expensive optical components and the range of this demodulator is very limited (only up to 3000µε). A multiplexed Bragg grating sensor configuration utilizing chirped FBG as interrogator is also known. This design is complicated and expensive as it employs Erbium-doped fiber amplifier, RF generator, phase detector etc. In another complex FBG interrogation technique, there is provided a chirped fiber grating based Sagnac loop. Though the claimed resolution is good (around ±5µε), the strain measurement range is very limited (around ±250µε). An interrogation technique using identical chirped FBGs has also been proposed for strain sensing with a resolution of 5µε. In this technique, the strain measurement range could be as high as 10000µε, but it can only measure the strain in one direction (tension or compression), which limits the application of this design.

SUMMARY

The invention is defined in the independent claims. Further embodiments of the invention are defined in the dependent claims.

According to an embodiment, an optical sensor for sensing at least one parameter is provided. The optical sensor may include an optical source configured to provide a source optical signal, a grating arrangement optically coupled to the optical source to receive the source optical signal, the grating arrangement including a chirped fiber Bragg grating (FBG) having a defined spectral profile, wherein the optical sensor is configured to provide a reference spectral profile, wherein the chirped FBG is configured, in response to a first change in the at least one parameter interacting with the chirped FBG, to change from an original state to a first state to shift the defined spectral profile in a first direction relative to the reference spectral profile, and the grating arrangement is configured, in response to the defined spectral profile being shifted in the first direction, to generate a first output optical signal corresponding to the first change, and wherein the chirped FBG is configured, in response to a second change in the at least one parameter interacting with the chirped FBG, to change from the original state to a second state to shift the defined spectral profile in a second direction relative to the reference spectral profile, and the grating arrangement is configured, in response to the defined spectral profile being shifted in the second direction, to generate a second output optical signal corresponding to the second change.

According to an embodiment, a sensor arrangement is provided. The sensor arrangement may include a plurality of optical sensors, wherein at least one optical sensor of the plurality of optical sensors is an optical sensor as described herein.

According to an embodiment, a sensor arrangement is provided. The sensor arrangement may include a plurality of optical sensors, wherein at least one optical sensor of the plurality of optical sensors is an optical sensor as described herein having a wireless module, and a wireless communication unit configured to communicate with the wireless module.

According to an embodiment, a method for sensing at least one parameter using an optical sensor as described herein is provided. The method may include determining, in response to the first change in the at least one parameter, the first change based on the first output optical signal, and determining, in response to the second change in the at least one parameter, the second change based on the second output optical signal.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Figure 1A:
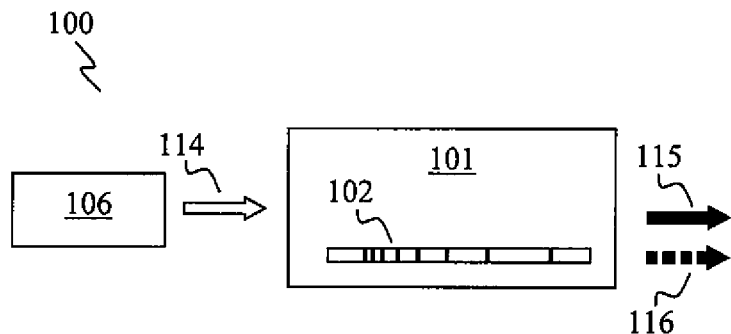
FIG. 1A shows a schematic diagram of an optical sensor, according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the phrase "at least substantially" may include "exactly" and a reasonable variance.

In the context of various embodiments, the term "about" as applied to a numeric value encompasses the exact value and a reasonable variance.

As used herein, the term "and/or" includes any and all combinations of one or more of the associated listed items.

As used herein, the phrase of the form of "at least one of A or B" may include A or B or both A and B. Correspondingly, the phrase of the form of "at least one of A or B or C", or including further listed items, may include any and all combinations of one or more of the associated listed items.

Various embodiments may provide one or more (optical) sensors or (optical) sensor modules/designs using fiber Bragg gratings (FBGs), e.g., chirped FBGs (CFBGs). The sensor(s) may be an optical intensity based FBG interrogation system. For example, in various embodiments, information may be interrogated in terms of a change in the intensity of the output signal. This may mean that information (e.g., magnitude, level, direction) relating to the parameter to be measured and/or the change thereof may be obtained on the basis of the intensity or change thereof of an output optical signal that is detected.

Various embodiments may provide one or more of the following: (i) wavelength shifted chirped fiber Bragg gratings (FBGs) for simultaneous true positive/negative strain and temperature measurements; (ii) wavelength-shifted chirped FBGs for temperature compensated strain measurements; (iii) chirped fiber Bragg grating based wireless strain and temperature sensing systems.

Some of the known FBG interrogation techniques can measure both the positive and negative strains, but they have at least one of the following issues: poor resolution, short measurement range or the system's performance being dependent on electrical components like a piezoelectric sensor/transducer. Also, most of these designs involve complicated experimental setup. Designs like identical chirped FBGs for interrogation are simple and seem robust, but they employ too many optical components and could measure positive strain only. Measuring strain in both directions (positive and negative) is generally necessary for almost all applications. The sensor designs of various embodiments include this feature and, further, the designs may employ a minimum number of optical components (for example, the sensor design presented in FIG. 3A employs (only) one CFBG for one parameter monitoring). Further, the sensing systems of various embodiments may have the ability to compensate for the rise or fall in temperature. Various embodiments may fulfil one or more requirements desired for practical applications, including wide range of measurement, good resolution and strain measurement in both positive and negative directions.

Various embodiments may provide a wavelength shifted chirped FBG (CFBG) interrogation system. It is an optical intensity based FBG interrogation system which may be able to measure positive/negative strain and temperature changes simultaneously. This system is simple, cost effective, and compact with a strain resolution of around 1με. A chirp bandwidth of about 5 nm may provide a strain measurement range of about ±4000με. The sensor designs of various embodiments may abrogate the need for OSA and make FBGs more suitable for field applications.

One of the sensor designs of various embodiments may employ two pairs of wavelength shifted chirped fiber Bragg gratings (CFBGs). The CFGBs may be coupled with a superluminescent diode (SLED). One pair of CFBGs may measure strain and the other pair may measure temperature. The spectra of both pairs are kept apart (no overlapping) from each other to avoid cross talk. The design may be capable of measuring strain as well as temperature in both the positive and negative directions. Temperature may be measured at the same time as strain. This sensor design may also be capable of measuring true strain (temperature independent) in both the positive and negative directions. The strain responsivity of this system is about 750 pW/με (e.g., at an input power of 2.5 mW) which is higher than that of any known sensor design. One micro-strain resolution (1με) may be achievable with such a high sensitivity. A photodiode with a sensitivity of about 0.3-0.4 nW would be able to provide a strain resolution of less than 1με. The resolution may be enhanced further by increasing the reflectivity of CFBGs and/or the power of the light source.

A second sensor design of various embodiments may employ two broadband CFBGs which may be coupled with a light emitting diode (LED). One of the CFBGs may measure strain and the other one may measure temperature. This design may be capable of measuring strain as well as temperature in both the positive and negative directions. The strain responsivity of this system is about 1.5 pW/με leading to a strain measurement resolution of about 5-10με. A minimum number of optical components may be employed in this design. It employs (only) one CFBG for one parameter monitoring.

Compared to known FBG interrogation designs, the CFBG interrogation designs of various embodiments may provide one or more of the following:

(1) The sensing systems of various embodiments may require the least number of optical/electrical components of all the known sensing systems. It makes the sensor modules simple, compact and robust.
(2) High cost has been the biggest issue for almost all the known FBG interrogation designs. As described earlier, minimum optical/electrical component may be required in the sensing systems of various embodiments. Moreover, one of them employs a simple LED as the light source. All these features may bring down its cost to a very competitive level.
(3) The sensors of various embodiments may be capable of measuring strain/temperature in both directions (positive and negative). Both strain and temperature may be measured simultaneously. There is also provided an arrangement for temperature compensation to get true strain in the sensor designs of various embodiments. The range of strain measurement may be as good as ±5000με.
(4) The strain measurement resolution of one of the sensing systems of various embodiments, having two pairs of CFBGs, may be less than about 1με and multiplexing may be done. The other sensing system may have a strain measurement resolution of about 5-10με, which may be further improved to about 1με by increasing the light input from the LED or by using a higher sensitivity power-meter/photodiode.

FIG. 1A shows a schematic diagram of an optical sensor 100, according to various embodiments. The optical sensor 100 may be employed for sensing at least one parameter. The optical sensor 100 includes an optical source 106 configured to provide a source optical signal (represented by the open arrow 114), and a grating arrangement 101 optically coupled to the optical source 106 to receive the source optical signal 114, the grating arrangement 101 including a chirped fiber Bragg grating (FBG) 102 having a defined spectral profile, wherein the optical sensor 100 is configured to provide a reference spectral profile, wherein the chirped FBG 102 is configured, in response to a first change in the at least one parameter interacting with the chirped FBG 102, to change from an original state to a first state to shift the defined spectral profile in a first direction relative to the reference spectral profile, and the grating arrangement 101 is configured, in response to the defined spectral profile being shifted in the first direction, to generate a first output optical signal (represented by the solid arrow 115) corresponding to the first change, and, wherein the chirped FBG 102 is configured, in response to a second change in the at least one parameter interacting with the chirped FBG 102, to change from the original state to a second state to shift the defined spectral profile in a second direction relative to the reference spectral profile, and the grating arrangement 101 is configured, in response to the defined spectral profile being shifted in the second direction, to generate a second output optical signal (represented by the dashed arrow 116) corresponding to the second change.

In other words, an optical sensor 100 capable of optically sensing one or more parameters may be provided. The optical sensor 100 may include an optical source (or light source) 106, and a grating arrangement 101 arranged to receive a source optical signal (or source light) 114 generated by the optical source 106. The grating arrangement 101 may include a chirped FBG (or CFBG) 102 having a defined spectral profile. The optical sensor 100 may provide or define an associated reference spectral profile.

The chirped FBG may be or may include a sensor grating for sensing at least one parameter. The chirped FBG 102 may reflect and/or transmit light based on the defined spectral profile. The chirped FBG 102 may receive the source optical signal 114 or a portion thereof.

In response to a first change (e.g., a positive change, or a change in a first direction, or a change in a positive (+) direction) in at least one parameter interacting with (or acting on) the chirped FBG 102, the chirped FBG 102 may change from an original state (e.g., a pristine state) to a first state to shift the defined spectral profile in a first direction relative to the reference spectral profile. In response to the defined spectral profile being shifted in the first direction, as a consequence of the first change in the at least one parameter or the change of the chirped FBG 102 to the first state, the grating arrangement 101 may provide a first output optical (light) signal 115 corresponding to the first change. The first output optical signal 115 may have a first intensity indicative of (or related to) the first change.

Further, in response to a second change (e.g., a negative change, or a change in a second direction, or a change in a negative (−) direction) in the at least one parameter interacting with (or acting on) the chirped FBG 102, the chirped FBG 102 may change from the original state to a second state to shift the defined spectral profile in a second direction (which may be a direction different to the first direction, e.g., opposite to the first direction) relative to the reference spectral profile. In response to the defined spectral profile being shifted in the second direction, as a consequence of the second change in the at least one parameter or the change of the chirped FBG 102 to the second state, the grating arrangement 101 may provide a second output optical (light) signal 116 corresponding to the second change. The second output optical signal 116 may have a second intensity indicative of (or related to) the second change.

In various embodiments, depending on the relative positioning between the defined spectral profile of the chirped FBG 102 at the original state and the reference spectral profile (i.e., how the reference spectral profile and the defined spectral profile at the original state of the chirped FBG may be positioned relative to each other), and the direction of the change in the at least one parameter, one of the first output optical signal 115 and the second output optical signal 116 may have an intensity that may be higher than the intensity of the output optical signal when the chirped FBG 102 is in the original state, while the other of the first output optical signal 115 and the second output optical signal 116 may have an intensity that may be lower than the intensity of the output optical signal when the chirped FBG 102 is in the original state.

A photodetector arrangement (for example, having one or more photodetectors) may be provided or employed to receive the first output optical signal 115 and the second output optical signal 116.

As described, the at least one parameter may act on the chirped FBG 102 to change the chirped FBG 102 from the original state to another state, where the result following this change in the chirped FBG 102 may be correlated with the at least one parameter, e.g., the value of the at least one parameter, or the change in the value of the at least one parameter.

While the defined spectral profile may be shifted, the reference spectral profile may remain unchanged or stationary. In other words, the reference spectral profile itself is not shifted.

In the context of various embodiments, the terms "chirped fiber Bragg grating" or "chirped FBG" or "CFBG" may mean a fiber Bragg grating having a grating period that changes along the grating, where the variation in the grating period may be referred to as a chirp. The period may change linearly along the grating.

Where an input light is provided to a fiber Bragg grating (FBG), the FBG reflects light or light portion of a particular wavelength (Bragg wavelength) related to the grating period, while transmitting light of the remaining wavelengths. By providing a chirp in the grating, thus forming a chirped FBG, the reflected wavelength changes with the change in the grating period. Thus, light of multiple wavelengths may be reflected by a chirped FBG, thereby broadening the reflected spectrum compared to a non-chirped FBG that may provide a narrow or sharp reflected spectrum.

In the context of various embodiments, the term "spectral profile" may refer to an optical profile, or optical response, or spectral response, or variation of reflectance or transmittance with respect to wavelengths. A spectral profile may include at least one of a transmission spectrum or a reflection spectrum.

In the context of various embodiments, the "original state" with respect to a chirped FBG may mean the state of the chirped FBG in a form and dimension when not affected by a change in a parameter that the chirped FBG may be employed to sense. For example, the chirped FBG may be in a state that is not stretched, expanded, contracted, compressed, etc., resulting from a change in the at least one parameter interacting with the chirped FBG. In other words, in the original state, the chirped FBG may be as-fabricated, or as-installed at the target position for sensing the at least one parameter. In some embodiments, the fabricated chirped FBG may be intentionally modified, for example, stretched, prior to installation at the target position, and the chirped FBG, as-modified and as-installed, may be defined to be in the original state.

In various embodiments, one of the first state and the second state may be an expanded or elongated state, while the other of the first state and the second state may be a shrunk or contracted or compressed state.

In various embodiments, each of the first change and the second change in the at least one parameter may be with respect to a common reference state or point of the at least one parameter when the chirped FBG 102 is in the original state. One of the first change and the second change may be a positive change (or change in a positive direction) with respect to the common reference state, while the other of the first change and the second change may be a negative change (or change in a negative direction) with respect to the common reference state. Each of the first change and the second change in the at least one parameter may include a change in at least one of a value or direction associated with the at least one parameter.

In the context of various embodiments, the at least one parameter may include at least one of strain or temperature. By being able to measure strain, the optical sensor 100 may also be used to monitor crack(s).

One of the first change and the second change may be a positive change in strain (e.g., a tensile strain may be acting on the chirped FBG 102), while the other of the first change and the second change may be a negative change in strain (e.g., a compressive strain may be acting on the chirped FBG 102). Application of a tensile strain on the chirped FBG 102 may lead to an expansion or elongation of the chirped FBG 102, while application of a compressive strain on the chirped FBG 102 may lead to an contraction or shrinkage of the chirped FBG 102.

One of the first change and the second change may be an increase in temperature, while the other of the first change and the second change may be a decrease in temperature. An increase in temperature may lead to an expansion or elongation of the chirped FBG 102, while a decrease in temperature may lead to a contraction or shrinkage of the chirped FBG 102.

It should be appreciated that at least one of the first change or the second change may include changes in both strain and temperature.

In various embodiments, the first output optical signal 115 (or its associated intensity) may provide an indication of the (absolute) value of the at least one parameter, after the first change in the at least one parameter. The second output optical signal 116 (or its associated intensity) may provide an indication of the (absolute) value of the at least one parameter, after the second change in the at least one parameter.

The optical sensor 100 may further include a photodetector (e.g., a photodiode) configured to receive the first output optical signal 115 and the second output optical signal 116. The photodetector may be optically coupled to the grating arrangement 101. The photodetector may convert the first output optical signal 115 and the second output optical signal 116 to a first output electrical signal and a second output electrical signal respectively.

In various embodiments, the grating arrangement 101 may further include a second chirped FBG optically coupled to the chirped FBG 102. The chirped FBG 102 and the second chirped FBG may form a first pair of chirped FBGs. The second chirped FBG may provide the reference spectral profile. In this way, the spectral profile of the second chirped FBG may be the reference spectral profile. The defined spectral profile at the original state of the chirped FBG 102 and the reference spectral profile may be shifted relative to each other in wavelength. In response to the defined spectral profile being shifted in the first direction, as a consequence of the first change in the at least one parameter, or the change of the chirped FBG 102 to the first state, the chirped FBG 102 may generate a first reflected optical signal (from the source optical signal 114), and the second chirped FBG may transmit, based on the reference spectral profile, a portion of the first reflected optical signal as the first output optical signal 115. In response to the defined spectral profile being shifted in the second direction, as a consequence of the second change in the at least one parameter, or the change of the chirped FBG 102 to the second state, the chirped FBG 102 may generate a second reflected optical signal (from the source optical signal 114), and the second chirped FBG may transmit, based on the reference spectral profile, a portion of the second reflected optical signal as the second output optical signal 116. The photodetector may be optically coupled to the second chirped FBG. As described, the chirped FBG 102 may be operable in reflection mode while the second chirped FBG may be operable in transmission mode.

The chirped FBG 102 may be configured to sense the at least one parameter, or in other words, the at least one parameter may interact with the chirped FBG 102. Therefore, the chirped FBG 102 may be a sensor grating. The second chirped FBG may be a reference grating, acting as a reference for the chirped FBG 102. This may mean that the chirped FBG 102 may receive an optical signal, for example, the source optical signal 114 or part thereof, where a portion of the optical signal may be reflected by the chirped FBG 102 based on the defined spectral profile. The portion of the optical signal reflected by the chirped FBG 102 may be received by the second chirped FBG, which may subsequently reflect a portion thereof and transmit the remaining portion, based on the reference spectral profile.

As described, the chirped FBG 102 and the second chirped FBG may be wavelength shifted chirped FBGs. In other words, there may be a mismatch between the defined spectral profile (at the original state of the chirped FBG 102) and the reference spectral profile. As such, it should be appreciated that the chirped FBG 102 and the second chirped FBG may not be identical gratings due to the mismatch in their respective spectral profiles. However, it should be appreciated that the shape of the respective spectral profiles of the chirped FBG 102 and the second chirped FBG may be similar or identical. The defined spectral profile and the reference spectral profile may partially overlap each other.

In various embodiments, the defined spectral profile (at the original state of the chirped FBG 102) and the reference spectral profile may be shifted by a wavelength spacing. For example, the respective central wavelengths of the defined spectral profile and the reference spectral profile may be shifted or separated relative to each other by a wavelength spacing. As non-limiting examples, this may be a wavelength spacing of about 2.5 nm, about 5 nm, about 10 nm, or about 20 nm. As a further non-limiting example, the defined spectral profile and the reference spectral profile may be shifted by about half of the bandwidth of one of the chirped FBG 102 or the second chirped FBG, i.e., a wavelength spacing equivalent to about half of the bandwidth. However, it should be appreciated that the shift may be of any amount or fraction of the bandwidth.

In various embodiments, the grating arrangement 101 may further include a third chirped FBG having a second defined spectral profile, and a fourth chirped FBG configured to provide a second reference spectral profile. In this way, the spectral profile of the fourth chirped FBG may be the second reference spectral profile. The fourth chirped FBG may be optically coupled to the third chirped FBG. The third chirped FBG and the fourth chirped FBG may form a second pair of chirped FBGs. The second defined spectral profile at an original state (e.g., a pristine state) of the third chirped FBG and the second reference spectral profile may be shifted relative to each other in wavelength.

In response to a third change (e.g., a positive change, or a change in a third direction, or a change in a positive (+) direction) in a parameter interacting with (or acting on) the third chirped FBG, the third chirped FBG may change from the original state to a third state to shift the second defined spectral profile in a third direction relative to the second reference spectral profile. The third chirped FBG may generate a third reflected optical signal (from the source optical signal 114) in response to the second defined spectral profile being shifted in the third direction, and the fourth chirped FBG may transmit, based on the second reference spectral profile, a portion of the third reflected optical signal as a third output optical (light) signal corresponding to the third change. The third output optical signal may have a third intensity indicative of (or related to) the third change.

In response to a fourth change (e.g., a negative change, or a change in a fourth direction, or a change in a negative (−) direction) in the parameter interacting with (or acting on) the third chirped FBG, the third chirped FBG may change from the original state to a fourth state to shift the second defined spectral profile in a fourth direction (which may be a direction different to the third direction, e.g., opposite to the third direction) relative to the second reference spectral profile. The third chirped FBG may generate a fourth reflected optical signal (from the source optical signal 114) in response to the second defined spectral profile being shifted in the fourth direction, and the fourth chirped FBG may transmit, based on the fourth reference spectral profile, a portion of the fourth reflected optical signal as a fourth output optical (light) signal corresponding to the fourth change. The fourth output optical signal may have a fourth intensity indicative of (or related to) the fourth change.

While the second defined spectral profile may be shifted, the second reference spectral profile may remain unchanged or stationary. In other words, the second reference spectral profile itself is not shifted.

As described, the third chirped FBG may be operable in reflection mode while the fourth chirped FBG may be operable in transmission mode.

The third chirped FBG may be configured to sense a parameter, or in other words, the parameter may interact with the third chirped FBG. Therefore, the third chirped FBG may be a sensor grating. The fourth chirped FBG may be a reference grating, acting as a reference for the third chirped FBG. This may mean that the third chirped FBG may receive an optical signal, for example, the source optical signal 114 or part thereof, where a portion of the optical signal may be reflected by the third chirped FBG based on the second defined spectral profile. The portion of the optical signal reflected by the third chirped FBG may be received by the fourth chirped FBG, which may subsequently reflect a portion thereof and transmit the remaining portion, based on the second reference spectral profile.

As described, the third chirped FBG and the fourth chirped FBG may be wavelength shifted chirped FBGs. In other words, there may be a mismatch between the second defined spectral profile (at the original state of the third chirped FBG) and the second reference spectral profile. As such, it should be appreciated that the third chirped FBG and the fourth chirped FBG may not be identical gratings due to the mismatch in their respective spectral profiles. However, it should be appreciated that the shape of the respective spectral profiles of the third chirped FBG and the fourth chirped FBG may be similar or identical. The second defined spectral profile and the second reference spectral profile may partially overlap each other.

In various embodiments, the second defined spectral profile (at the original state of the third chirped FBG) and the second reference spectral profile may be shifted by a wavelength spacing. For example, the respective central wavelengths of the second defined spectral profile and the second reference spectral profile may be shifted or separated relative to each other by a wavelength spacing. As non-limiting examples, this may be a wavelength spacing of about 2.5 nm, about 5 nm, about 10 nm, or about 20 nm. As a further non-limiting example, the second defined spectral profile and the second reference spectral profile may be shifted by about half of the bandwidth of one of the third chirped FBG or the fourth chirped FBG, i.e., a wavelength spacing equivalent to about half of the bandwidth. However, it should be appreciated that the shift may be of any amount or fraction of the bandwidth.

In various embodiments, the chirped FBG 102 may be configured to be coupled or bonded to a target point, object, position or location, while the third chirped FBG may be adapted to be positioned (e.g., left free or unbonded) adjacent or close to the chirped FBG 102 at the target position. The chirped FBG 102 may be employed to measure strain, while the third chirped FBG may be employed to measure temperature. The chirped FBG 102 may also measure temperature.

In various embodiments, the first direction may be the same as one of the third direction and the fourth direction, while the second direction may be the same as the other of the third direction and the fourth direction.

In terms of wavelength (or in wavelength scale), the defined spectral profile (at the original state of the chirped 102) and the reference spectral profile may be completely spaced apart from the second defined spectral profile (at the original state of the third chirped FBG) and the second reference spectral profile. In other words, the defined spectral profile and the reference spectral profile do not overlap with the second defined spectral profile and the second reference spectral profile.

It should be appreciated that description in the context of the chirped FBG and the second chirped FBG may be correspondingly applicable to the third chirped FBG and the fourth chirped FBG, and vice versa.

The optical sensor 100 may further include a second photodetector (e.g., a photodiode) configured to receive the third output optical signal and the fourth output optical signal. The second photodetector may be optically coupled to the fourth chirped FBG. The second photodetector may convert the third output optical signal and the fourth optical signal to a third output electrical signal and a fourth output electrical signal respectively.

In various embodiments, the optical source 106 may be configured to provide the reference spectral profile. In other words, the spectral profile of the optical source 106 may be the reference spectral profile. As such, the optical source 106 may act as a reference for the chirped FBG 102. The defined spectral profile (at the original state of the chirped FBG 102) may overlap with a (small) portion of the reference spectral profile. In response to the defined spectral profile being shifted in the first direction, as a consequence of the first change in the at least one parameter, or the change of the chirped FBG 102 to the first state, the chirped FBG 102 may transmit a first portion of the source optical signal 114 as the first output optical signal 115. In response to the defined spectral profile being shifted in the second direction, as a consequence of the second change in the at least one parameter, or the change of the chirped FBG 102 to the second state, the chirped FBG 102 may transmit a second portion of the source optical signal 114 as the second output optical signal 116. As described, the chirped FBG 102 may be operable in transmission mode. The photodetector may be optically coupled to the chirped FBG 102.

The defined spectral profile may span a wavelength range within or corresponding to the portion of the reference spectral profile. The wavelength range of the entire defined spectral profile may be smaller than the wavelength range of the entire reference spectral profile.

In various embodiments, the portion of the reference spectral profile may be between a peak and a valley of the reference spectral profile. The peak may correspond to the maximum point/value of the reference spectral profile. The valley may correspond to the minimum point/value of the reference spectral profile.

In various embodiments, the portion of the reference spectral profile may be about half of the reference spectral profile.

The grating arrangement 101 may further include a second chirped FBG having a second defined spectral profile. The second defined spectral profile (at the original state of the second chirped FBG) may overlap with a (small) portion of the reference spectral profile. The optical source 106 may act as a reference for the second chirped FBG.

In response to a third change (e.g., a positive change, or a change in a third direction, or a change in a positive (+) direction) in a parameter interacting with (or acting on) the second chirped FBG, the second chirped FBG may change from an original state (e.g., a pristine state) to a third state to shift the second defined spectral profile in a third direction relative to the reference spectral profile. The second chirped FBG may, in response to the second defined spectral profile being shifted in the third direction, transmit a third portion of the source optical signal 114 as a third output optical (light) signal corresponding to the third change. The third output optical signal may have a third intensity indicative of (or related to) the third change.

In response to a fourth change (e.g., a negative change, or a change in a fourth direction, or a change in a negative (−) direction) in the parameter interacting with (or acting on) the second chirped FBG, the second chirped FBG may change from the original state to a fourth state to shift the second defined spectral profile in a fourth direction (which may be a direction different to the third direction, e.g., opposite to the third direction) relative to the reference spectral profile. The second chirped FBG may, in response to the second defined spectral profile being shifted in the fourth direction, transmit a fourth portion of the source optical signal 114 as a fourth output optical (light) signal corresponding to the fourth change. The fourth output optical signal may have a fourth intensity indicative of (or related to) the fourth change. As described, the second chirped FBG may be operable in transmission mode.

While the defined spectral profile and the second defined spectral profile may be shifted, the reference spectral profile may remain unchanged or stationary. In other words, the reference spectral profile itself is not shifted.

The defined spectral profile and the second defined spectral profile may be identical to one another. This may mean that the chirped FBG 102 and the second chirped FBG may be identical to each other.

The defined spectral profile and the second defined spectral profile may overlap with or occupy the same portion of the reference spectral profile. Alternatively, the defined spectral profile and the second defined spectral profile may overlap with respective portions of the reference spectral profile on opposite sides of a peak (or valley) of the reference spectral profile.

The second defined spectral profile may overlap with a portion of the reference spectral profile that may be smaller than and/or within the portion of the reference spectral profile overlapping with the defined spectral profile, or vice versa.

It should be appreciated that description in the context of the portion of the reference spectral profile overlapping with the defined spectral profile may correspondingly be applicable to the portion of the reference spectral profile overlapping with the second defined spectral profile.

In various embodiments, the chirped FBG 102 may be configured to be coupled or bonded to a target point, object, position or location, while the second chirped FBG may be adapted to be positioned (e.g., left free or unbonded) adjacent or close to the chirped FBG 102 at the target position. The chirped FBG 102 may be employed to measure strain, while the second chirped FBG may be employed to measure temperature. The chirped FBG 102 may also measure temperature.

The optical sensor 100 may further include a second photodetector (e.g., a photodiode) configured to receive the third output optical signal and the fourth output optical signal. The second photodetector may be optically coupled to the second chirped FBG. The second photodetector may convert the third output optical signal and the fourth optical signal to a third output electrical signal and a fourth output electrical signal respectively.

In the context of various embodiments, the optical source 106 may be or may include a superluminescent diode (SLED) or a light emitting diode (LED).

The optical sensor 100 may further include at least one fiber coupler arranged to optically couple the optical source 106 to the grating arrangement 101. In some embodiments, there may be a first fiber coupler arranged to optically couple the optical source 106 to the chirped FBG 102 and the third chirped FBG, and a second fiber coupler arranged to optically couple the first fiber coupler to the second chirped FBG and the fourth chirped FBG. In some other embodiments, there may be one fiber coupler arranged to optically couple the optical source 106 to the chirped FBG 102 and the second chirped FBG.

The optical sensor 100 may further include a wireless module. The wireless module may enable wireless communication with the optical sensor 100, for example, transmission of one or more signals (including any signal(s) based on any one of the output optical signals described) of the optical sensor 100 via a wireless mode or channel. Therefore, the optical sensor 100 may be a wireless optical sensor.

The optical sensor 100 may further include a processor.

In various embodiments, one or more electrical components, for example, a processor, or a signal converter, may be provided, either internally with or external to the optical sensor 100 for processing one or more signals of the optical sensor 100.

In the context of various embodiments, any one of or each chirped FBG may be a broadband chirped FBG.

In the context of various embodiments, any one of or each chirped FBG may be arranged with its grating period increasing in a direction from an input side of the chirped FBG, where light may enter the chirped FBG or light reflected by the chirped FBG may exit, towards the output side of the chirped FBG, where light transmitted through the chirped FBG may exit. Nevertheless, the change in the grating period may be reversed, i.e., the grating period may decrease in the direction from an input side towards the output side of the chirped FBG.

The optical sensor 100 may be employed for (true) strain and temperature measurements. Measurements for both parameters may be carried out simultaneously.

As described above, the optical sensor 100 may be capable of measuring strain in two directions, e.g., positive and negative directions. Such a feature may be required in most of the mechanical and civil structural monitoring applications.

Figure 1B:
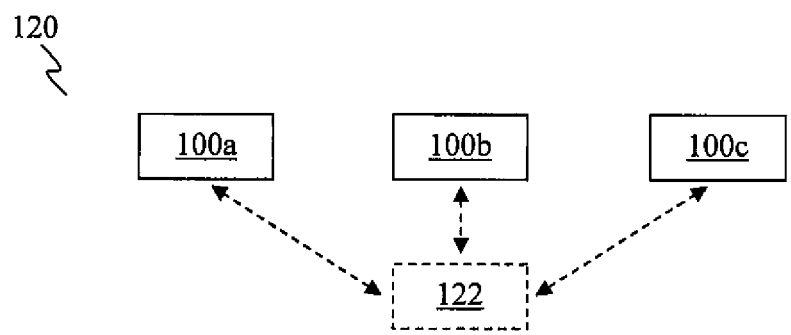
FIG. 1B shows a schematic diagram of a sensor arrangement, according to various embodiments.

FIG. 1B shows a schematic diagram of a sensor arrangement 120, according to various embodiments. The sensor arrangement 120 includes a plurality of optical sensors 100a, 100b, 100c, where at least one optical sensor 100a, 100b, 100c may be an optical sensor as described herein, including, for example, in the context of the optical sensor 100 (FIG. 1A).

In various embodiments, at least one optical sensor 100a, 100b, 100c may be an optical sensor as described herein having a wireless module, and the sensor arrangement 120 may further include a wireless communication unit 122 configured to communicate with the wireless module. The wireless communication unit 122 may further communicate with one or more devices via the internet. The wireless communication unit 122 may be or may include a wireless reception unit.

In various embodiments, each optical sensor 100a, 100b, 100c may be an optical sensor as described herein, including, for example, in the context of the optical sensor 100 (FIG. 1A).

While three optical sensors 100a, 100b, 100c are shown in FIG. 1B and correspondingly described, it should be appreciated that any number of optical sensors of two or more may be provided. In other words, in various embodiments, a sensor arrangement may include at least two optical sensors.

Figure 1C:
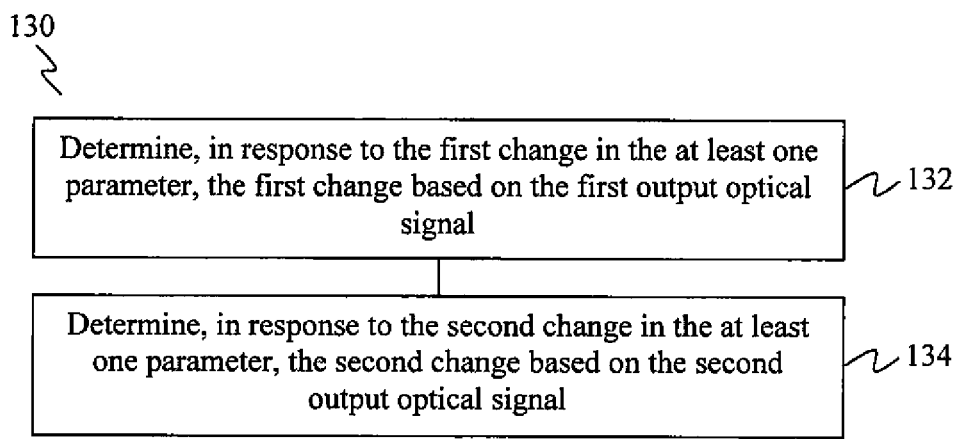
FIG. 1C shows a flow chart illustrating a method for sensing, according to various embodiments.

FIG. 1C shows a flow chart 130 illustrating a method for sensing at least one parameter using an optical sensor, according to various embodiments. The optical sensor may be as described herein, including, for example, in the context of the optical sensor 100 (FIG. 1A).

At 132, in response to the first change in the at least one parameter, the first change is determined based on the first output optical signal.

At 134, in response to the second change in the at least one parameter, the second change is determined based on the second output optical signal.

It should be appreciated that descriptions in the context of the optical sensor 100 may correspondingly be applicable in relation to the method for sensing described in the context of the flow chart 130.

Figure 2A:
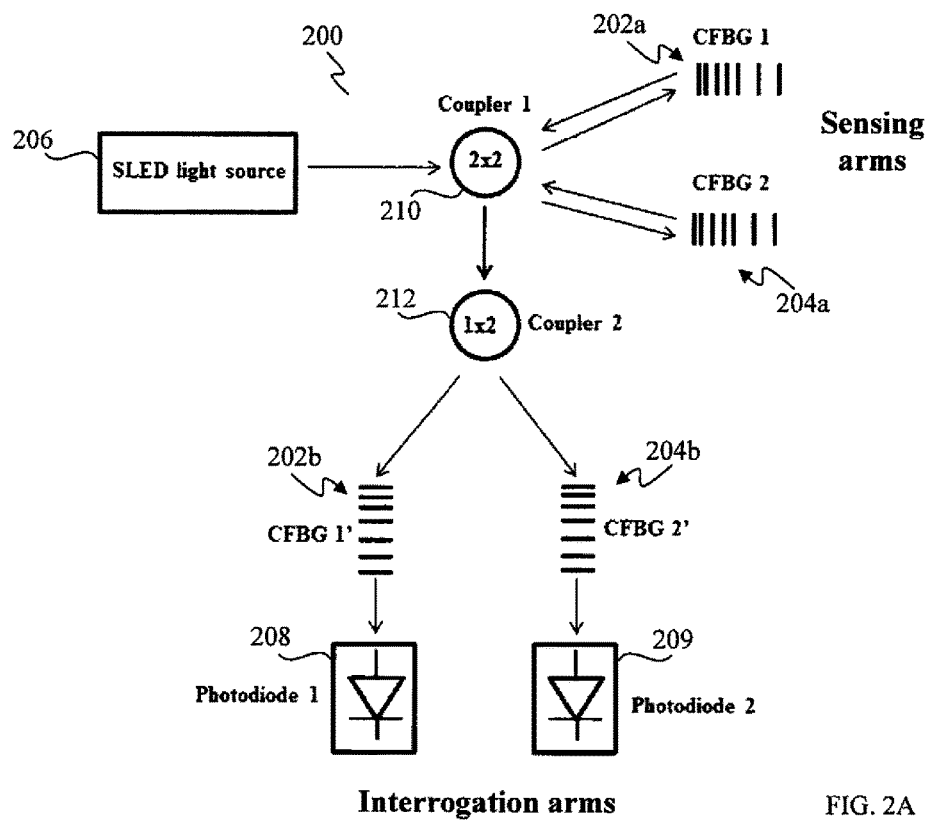
FIG. 2A shows a schematic view of a sensor, according to various embodiments.

FIG. 2A shows a schematic of a (optical) sensor 200, according to various embodiments, illustrating sensor design 1. The sensor 200 includes two pairs of chirped fiber Bragg gratings (CFBGs), e.g., wavelength shifted CFBGs. The first pair includes a first grating (CFBG1) 202a and a second grating (CFBG1') 202b, while the second pair includes a first grating (CFBG2) 204a and a second grating (CFBG2') 204b. The respective reflectivity of the CFBGs 202a, 202b, 204a, 204b, may be between about 80% and about 85%. CFBG1 202a and CFBG2 204a may be operable in reflection mode, and may function as or may be provided in the sensing arms of the sensor 200. CFBG1' 202b and CFBG2' 204b may be operable in transmission mode, and may function as or may be provided in the interrogation arms of the sensor 200. CFBG1' 202b and CFBG2' 204b may act as wavelength filters to CFBG1 202a and CFBG2 204a respectively.

Figure 2B:
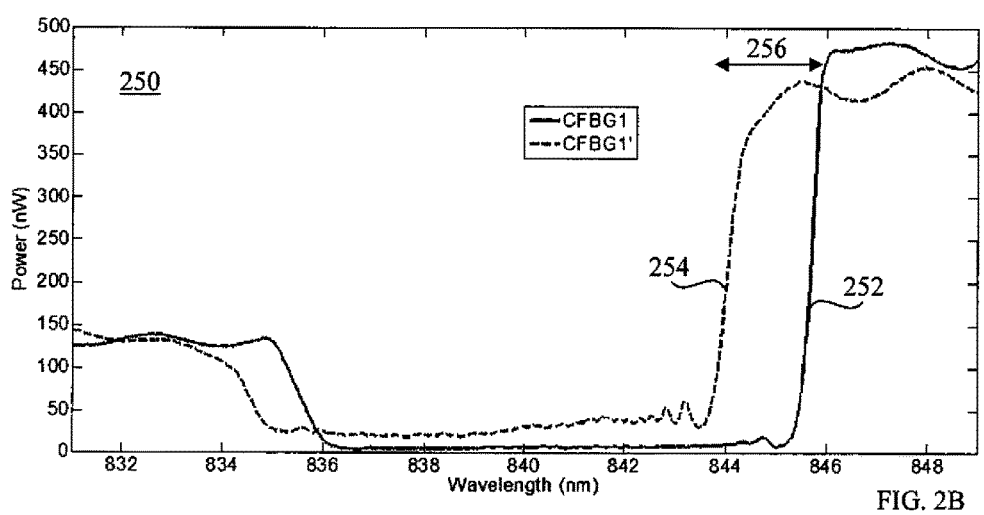
FIG. 2B shows a plot of the transmission spectra of gratings, CFBG1 and CFBG1 of the sensor of FIG. 2A.
Figure 2C:
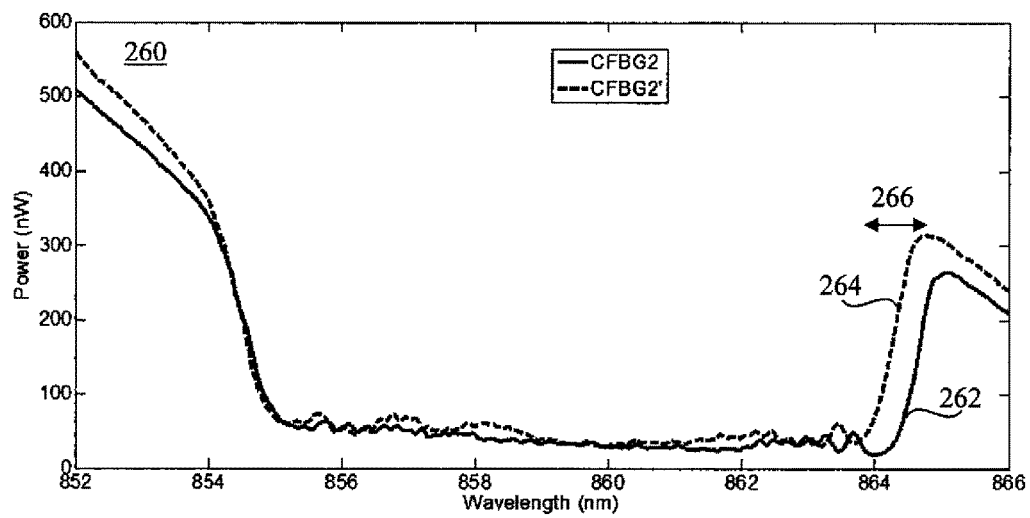
FIG. 2C shows a plot of the transmission spectra of gratings, CFBG2 and CFBG2', of the sensor of FIG. 2A.

The transmission spectra of CFBG1 202a and CFBG1' 202b are shown in FIG. 2B, where plot 250 illustrates the spectrum 252 corresponding to CFBG1 202a and the spectrum 254 corresponding to CFBG1' 202b. Further, the transmission spectra of CFBG2 204a and CFBG2' 204b are shown in FIG. 2C, where plot 260 illustrates the spectrum 262 corresponding to CFBG2 204a and the spectrum 264 corresponding to CFBG2' 204b. As may be observed, the bandwidth of the CFBGs 202a, 202b, 204a, 204b is about 10 nm. However, it should be appreciated that the bandwidth of any of the CFBGs 202a, 202b, 204a, 204b may be between about 5 nm and about 10 nm to accommodate the strain measurement range relating to various applications.

From FIG. 2B, it may be observed that CFBG1 202a and CFBG1' 202b are not identical and their spectra 252, 254 are shifted by about 1.7 nm relative to each other. Similarly, from FIG. 2C, it may be observed that CFBG2 204a and CFBG2' 204b are not identical and their spectra 262, 264 are shifted by about 0.4 nm relative to each other. Preferably, the spectral shift between the CFBGs of each pair may be half of the bandwidth of the CFBGs (e.g., about 5 nm based on the bandwidth observed). While such a spectral shift of about 5 nm may be achievable, there may be challenges involved in the fabrication process due to the unavailability of the appropriate phase masks. Further, it may be observed that both pairs of CFBGs are in completely different parts of the spectrum (i.e., non-overlapping), where the first pair of CFBG1 202a and CFBG1' 202b is in the range of about 835 nm-845 nm, and the second pair of CFBG2 204a and CFBG2' 204b is in the range of about 855 nm-865 nm.

Figure 2D:
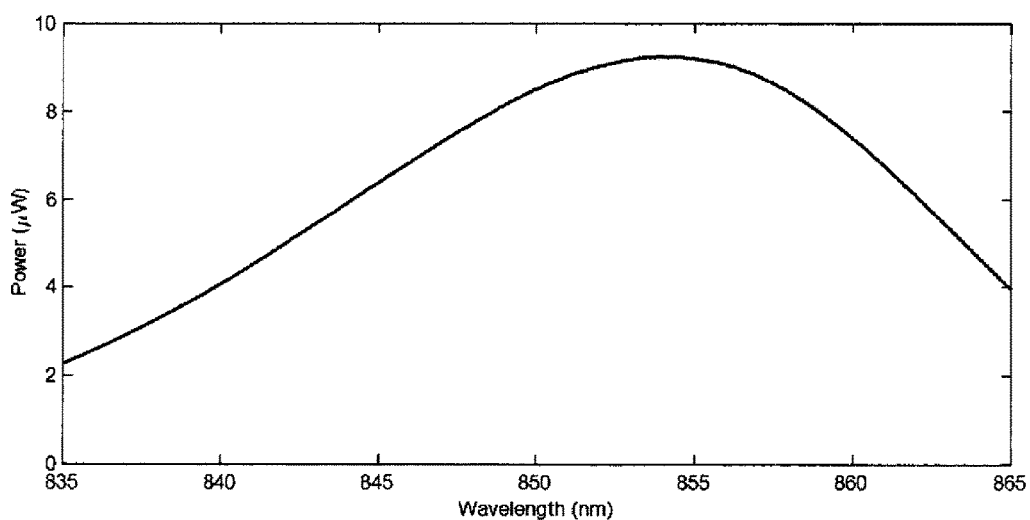
FIG. 2D shows a plot of the spectrum of the light source of the sensor of FIG. 2A.

Referring back to FIG. 2A, an SLED (superluminescent diode) light source 206 may be used in the sensor 200 to provide a source optical signal. The power of the SLED light source 206 may be variable. The spectrum of the SLED light source 206 is shown in FIG. 2D. Two fiber couplers, e.g., a 2×2 (e.g., 50:50) coupler 210 ("Coupler 1") and a 1×2 (e.g., 50:50) coupler 212 ("Coupler 2"), may be used in the sensor 200. Output optical signals or light intensities coming out of or transmitted by CFBG1' 202b and CFBG2' 204b may be measured or detected by a first photodetector (e.g., "Photodiode 1" 208), and a second photodetector (e.g., "Photodiode 2" 209), respectively.

The first pair (i.e., CFBG1 202a and CFBG1' 202b) may be used for strain measurement in both directions (tensile and compressive) by bonding CFBG1 202a to the target point. The second pair (i.e., CFBG2 204a and CFBG2' 204b) may be used to measure the temperature or change thereof at the (same) target point by keeping CFBG2 204a free but close to CFBG1 202a so as to measure the temperature or any change thereof, and may be independent of any effect of strain acting at the target point.

Light from the SLED 206 may be transmitted to CFBG1 202a and CFBG2 204a via the coupler 210. Light from the SLED 206 may initially be coupled into a fiber that may lead to the coupler 210. Light reflected by CFBG1 202a may be provided to the coupler 212 via the coupler 210, where the reflected light may be divided into two parts which pass through both the interrogation arms to propagate into and through CFBG1' 202b and CFBG2' 204b separately. Light reflected by CFBG2 204a may reach CFBG1' 202b and CFBG2' 204b in a similar fashion.

Since the spectrum (252, FIG. 2B) of CFBG1 202a is away or far from the spectrum (264, FIG. 2C) of CFBG2' 204b, the light reflected by CFBG1 202a goes through CFBG2' 204b uninterrupted. In this way, if a force such as strain is applied to CFBG1 202a, the light intensity received at Photodiode 2 209 does not change at all. On the other hand, when the light reflected by CFBG1 202a goes through CFBG1' 202b, it is blocked to a great extent. Only the non-overlapping region 256 of the spectrum 252 of CFBG1 202a goes through CFBG1' 202b and reaches the Photodiode 1 208. On the application of a tensile (positive) strain on CFBG1 202a, the spectrum 252 of CFBG1 202a shifts right and therefore, the non-overlapping region 256 increases. This results in an increase in the voltage measured by the Photodiode 1 208. Conversely, when a compressive (negative) strain is applied on CFBG1 202a, the spectrum 252 of CFBG1 202a shifts left, resulting in a reduction of the non-overlapping region 256. This consequently results in a decrease in the voltage measured by the Photodiode 1 208.

While the change in temperature may be sensed by both pairs of CFBGs (202a and 202b, 204a and 204b), in various embodiments, only the second pair of CFBG2 204a and CFBG2' 204b may be used for temperature measurement at the target point. CFBG2' 204b works as a wavelength filter for the light reflected by CFBG2 204a. Only the non-overlapping region 266 of the spectrum 262 of CFBG2 204a goes through CFBG2' 204b and reaches Photodiode 2 209. The rise or fall in the temperature moves the spectrum 262 of CFBG2 204a right or left respectively, resulting in an increase or decrease of the non-overlapping region 266. Consequently, the voltage measured by Photodiode 2 209 respectively increases or decreases. The voltage measured by Photodiode 1 208 remains unaffected as the spectrum 254 of CFBG1' 202b is far from the spectrum 262 of CFBG2 204a.

Since temperature or change thereof also shifts the spectrum 252 of CFBG1 202a, the combined effect of strain and temperature may be obtained at Photodiode 1 208. The change in the voltage of both Photodiode 1 208 and Photodiode 2 209 due to temperature variation may be correlated and then the temperature value may be accordingly subtracted from or added to the combined value measured at Photodiode 1 208 to obtain the true strain value. Thus, the sensor design 200 may provide the true strain (tensile or compressive) and temperature at the same time. The range of strain measurement may be increased by increasing the default mismatch (or the separation between the center wavelengths) between the spectra 252, 254 of CFBG1 202a and CFBG1' 202b. The range of temperature measurement may be increased by increasing the default mismatch between the spectra 262, 264 of CFBG2 204a and CFBG2' 204b.

Figure 3A:
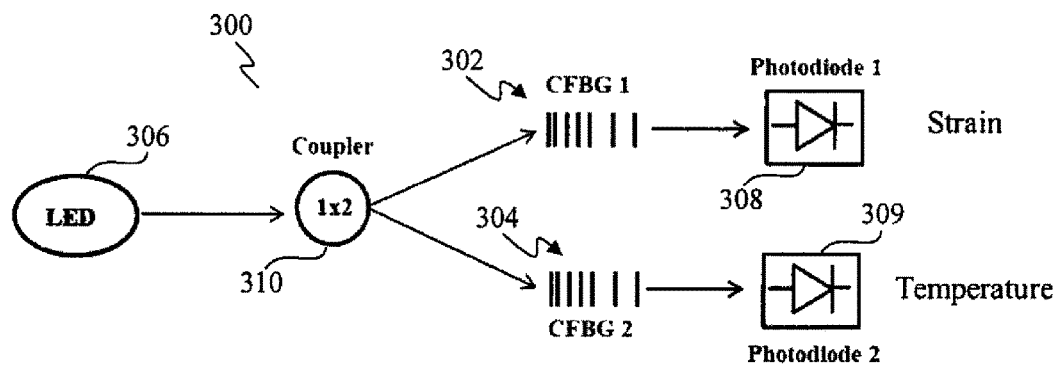
FIG. 3A shows a schematic view of a sensor, according to various embodiments.

FIG. 3A shows a schematic of a (optical) sensor 300, according to various embodiments, illustrating sensor design 2. The sensor 300 includes two chirped fiber Bragg gratings (CFBGs), e.g., a first grating (CFBG1) 302 and a second grating (CFBG2) 304. CFBG1 302 and CFBG2 304 may be two similar broadband CFBGs. The respective reflectivity of CFBG1 302 and CFBG2 304 may be between about 80% and about 85%. CFBG1 302 and CFBG2 304 may be operable in transmission mode.

Figure 3B:
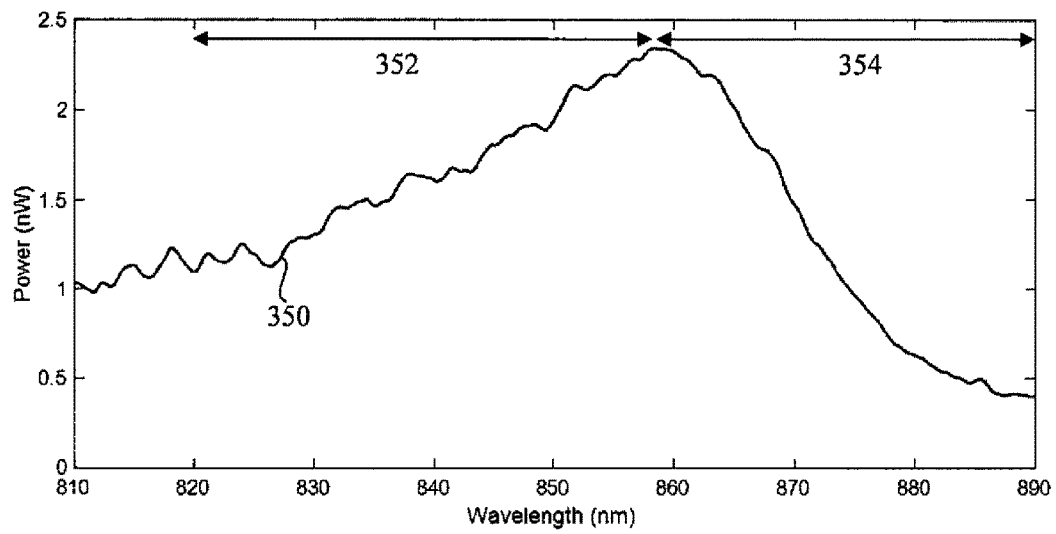
FIG. 3B shows a plot of the spectrum of the light source of the sensor of FIG. 3A.

An LED (light-emitting diode) light source 306 may be used in the sensor 300. The spectrum 350 of the LED light source 306 is shown in FIG. 3B. A fiber coupler, e.g., a 1×2 (e.g., 50:50) fiber coupler 310 may be employed to divide the light (or source optical signal) coming from the LED 306 into CFBG1 302 and CFBG2 304. CFBG1 302 and CFBG2 304 may act as wavelength filters to the light coming from the LED 306.

In various embodiments, the bandwidth of the CFBGs 302, 304 may be maintained at about half of the LED spectrum 350, for example, either from the beginning to the peak (e.g., about 820-857 nm) (the region indicated by the double-headed arrow 352), or from the peak to the end (e.g., about 857-890 nm) (the region indicated by the double-headed arrow 354) of the LED spectrum 350. In other words, the CFBGs 302, 304 may block either the first half (e.g., 820-857 nm) 352 or the second half (e.g., 857-890 nm) 354 of the LED spectrum 350. As a non-limiting example, the spectrum of the CFBGs 302, 304 may block the second half (857-890 nm) 354 of the LED spectrum 350. In other words, an optical signal or light in the region 354 of about 857-890 nm may not be transmitted through each of CFBG1 302 and CFBG2 304. It should be appreciated that the bandwidth of the CFBGs 302, 304 may be maintained at a portion of the LED spectrum 350 that is less than half of the LED spectrum 350.

Output optical signals or light intensities coming out from CFBG1 302 and CFBG2 304 may be measured by a first photodetector (e.g., "Photodiode 1" 308), and a second photodetector (e.g., "Photodiode 2" 309), respectively.

For the sensor 300, CFBG1 302 may be used for strain measurement in both directions (tension and compression) by bonding CFBG1 302 to the target point. CFBG2 304 may be used to measure the temperature or variations thereof at the (same) target point by keeping CFBG2 304 free but close to CFBG1 302.

The coupler 310 may divide the LED light into CFBG1 302 and CFBG2 304, and may reach the Photodiode 1 308 and the Photodiode 2 309 through CFBG1 302 and CFBG2 304, respectively. Using the above-mentioned example, CFBG1 302 and CFBG2 304 may block the second half (857-890 nm) 354 of the LED spectrum 350, while the first half (820-857 nm) 352 may reach the photodiodes 308, 309. If a tensile (positive) strain is applied to CFBG1 302, the spectrum of CFBG1 302 shifts right, releasing more light to Photodiode 1 308. If a compressive (negative) strain is applied to CFBG1 302, the spectrum of CFBG1 302 shifts left, blocking more light to Photodiode 1 308. Hence, the intensity of the light measured by Photodiode 1 308 increases for tensile (positive) strain, and decreases for compressive (negative) strain.

While the change in temperature may be sensed by both CFBGs 302, 304, in various embodiments, only CFBG2 304 may be used for temperature measurement at the target point. The rise or fall in temperature moves the spectrum of CFBG2 304 right or left, resulting in an increase or a decrease of the light intensity measured by Photodiode 2 309, respectively.

For both sensors 200, 300, since the temperature or change thereof shifts the spectrum of the CFBGs 202, 202a, 204a, 204b, 302, 304, the combined effect of strain and temperature may be obtained at Photodiode 1 208, 308, while the voltage measured by Photodiode 2 209, 309 changes purely due to temperature variations. The voltage change (measured from Photodiode 2 209, 309) induced due to temperature variations may be compensated to the voltage obtained from Photodiode 1 208, 308 to get true strain values. Thus, the sensor designs 200, 300 may be capable of measuring true strain (tensile/compressive) and temperature variations at the same time.

Results for both sensors 200, 300 will now be described by way of the following non-limiting examples and with reference to FIGS. 4A to 8C.

Figure 4A:
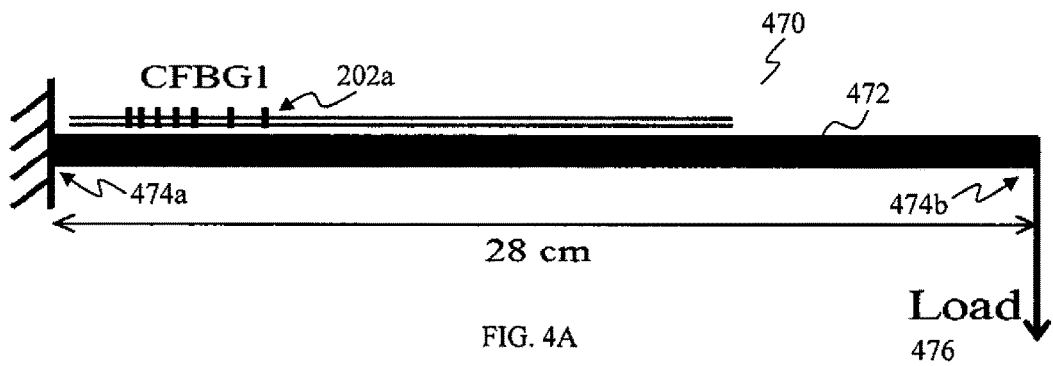
FIG. 4A shows a schematic view of a cantilever set-up for strain measurement.

FIG. 4A shows a schematic of a cantilever set-up 470 for strain measurement. Using the sensor 200 (FIG. 2A) as an illustrative example, and as strain may be measured using the first pair of CFBGs (CFBG1 202a and CFBG1' 202b, FIG. 2A) as described above, CFBG1 202a may be affixed or glued close to the fixed end 474a of a cantilever (e.g., an aluminum cantilever) 472 as shown in FIG. 4A. The length, breadth, and thickness of the cantilever 472 are about 280 mm, 19 mm and 3.3 mm, respectively. The power from the SLED light source 206 may be maintained at about 2.5 mW.

The cantilever 472 may be loaded (e.g., using a mass or load 476) at its free end 474b as shown in FIG. 4A. As CFBG1 202a is positioned at the top side of the cantilever 472, it experiences tensile (positive) strain (or extensional strain). Further, the cantilever 472 may be flipped upside down and loaded again in the same manner, where this time, CFBG1 202a, being at the bottom of the cantilever 472, experiences compressive (negative) strain.

Figure 4B:
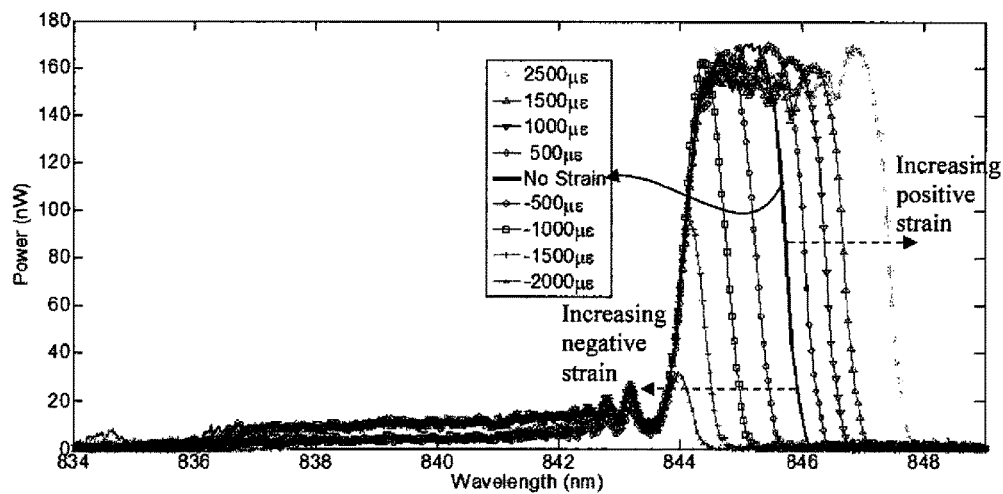
FIG. 4B shows a plot of the spectra of CFBG1 of the sensor of FIG. 2A corresponding to different strain values.
Figure 4C:
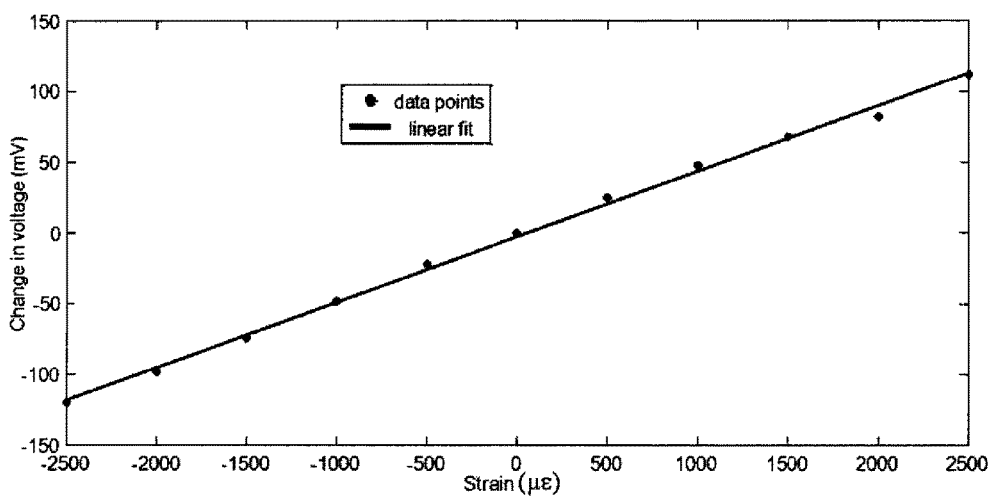
FIG. 4C shows a plot of strain versus change in voltage measured by Photodiode 1 of the sensor of FIG. 2A.

The spectrum of the light reflected by CFBG1 202a moves or shifts right or left on the corresponding application of tensile (positive) or compressive (negative) strain, resulting in an increase or a decrease of the non-overlapping area (as described above in relation to the spectra 252, 254, FIG. 2B). The spectra of CFBG1 202a, after passing through CFBG1' 202b, corresponding to different strain values are shown in FIG. 4B. The voltage measured by Photodiode 1 208 may be monitored continuously throughout this process. The positive and negative strains experienced by CFBG1 202a are plotted against the change in the voltage measured by Photodiode 1 208, where the results are as shown in FIG. 4C. It may be observed from FIG. 4C that the change in the voltage may be linearly correlated to the applied strain (or change thereof). Therefore, by looking at the change in the response (in terms of voltage) of Photodiode 1 208, the strain values may be determined.

Figure 4D:
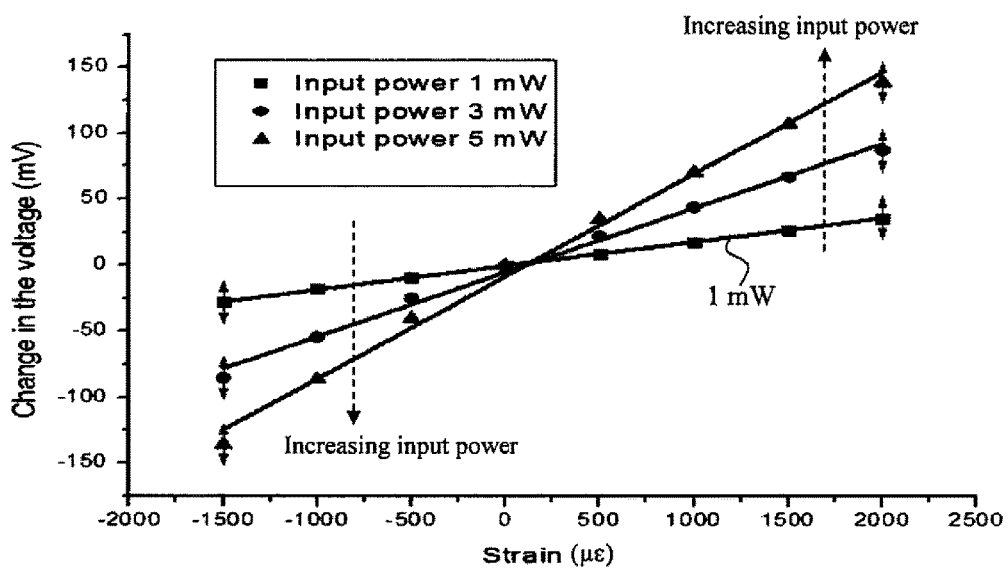
FIG. 4D shows a plot of strain versus voltage measured by Photodiode 1 of the sensor of FIG. 2A at various input powers.

The strain resolution of the sensors of various embodiments may be enhanced by increasing the reflectivity of the CFBGs employed and/or the input power (e.g., the power from the SLED light source 206). The results for the relationship of strain vs voltage (measured by Photodiode 1 208) at various input powers from SLED 206 are shown in FIG. 4D. Upon increasing the input power from about 1 mW to about 3 mW, the strain resolution increases by a factor of about 2.7. Subsequently, if the input power is increased to about 5 mW, the resolution increases by a factor of about 4.3. Accordingly, the strain resolution of the sensor of various embodiments, including the sensor 200, may be adjusted to the desired level by changing the input power. The slight deviation of the cross-over point from zero on the strain axis, as may be observed in FIG. 4D, may be due to the small residual strain in the cantilever 472 resulting from multiple loading and unloading.

For the sensor 200 (FIG. 2A), both pairs of CFBGs (202a and 202b, 204a and 204b) may behave similarly or exactly the same on the rise or fall in temperature as both CFBG1 202a and CFBG2 204a may be placed close to each other. Nevertheless, only the second pair of CFBG2 204a and CFBG2' 204b may be used for temperature measurement. This is because CFBG2 204a and CFBG2' 204b, by CFBG2 204a being kept free, may not be affected by the effect of strain. As such, the intensity of light transmitted through CFBG2' 204b may provide an indication of the true temperature value.

As an illustrative example, CFBG1 202a and CFBG2 204a may be placed close to each other in an oven to simulate a real condition. When the oven is turned on and the temperature rises from room temperature (about 25° C.) onwards, the spectra of both CFBG1 202a and CFBG2 204a shift right. In this case, the voltages measured by both Photodiode 1 208 and Photodiode 2 209 increase. Further, the temperature may be reduced below the room temperature to about 10° C. by putting CFBG1 202a and CFBG2 204a in a water bath containing a mixture of hot and cold water. On lowering the temperature, the spectra of both CFBG1 202a and CFBG2 204a shift left. In this case, the voltages measured by both Photodiode 1 208 and Photodiode 2 209 decrease.

Figure 5A:
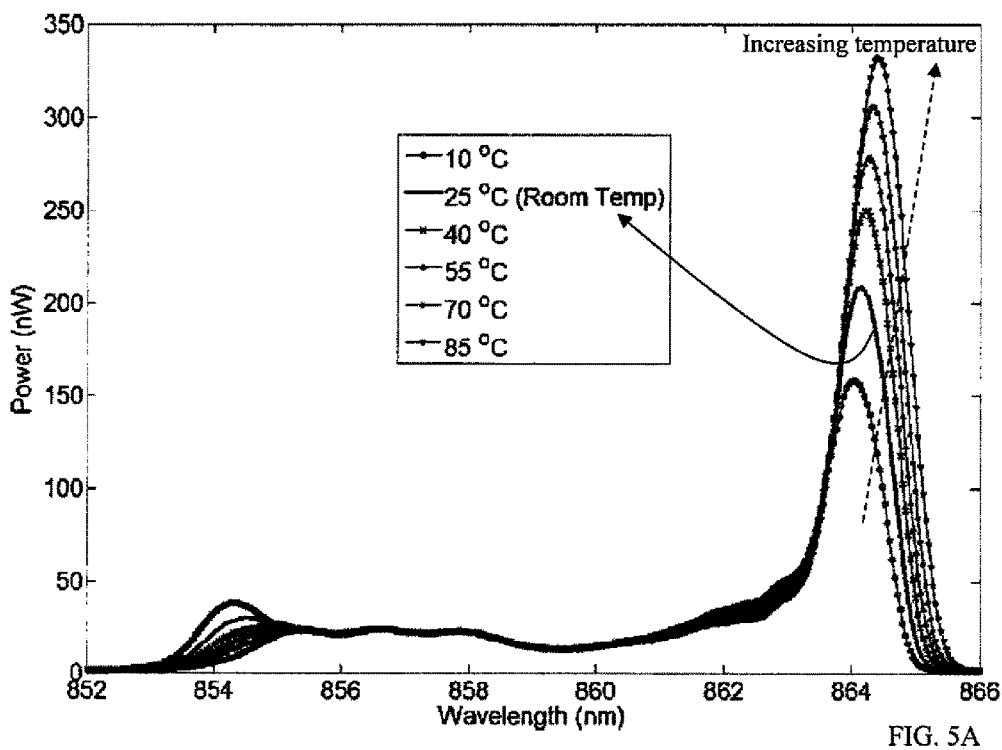
FIG. 5A shows a plot of the spectra of CFBG2 of the sensor of FIG. 2A corresponding to different temperature values.
Figure 5B:
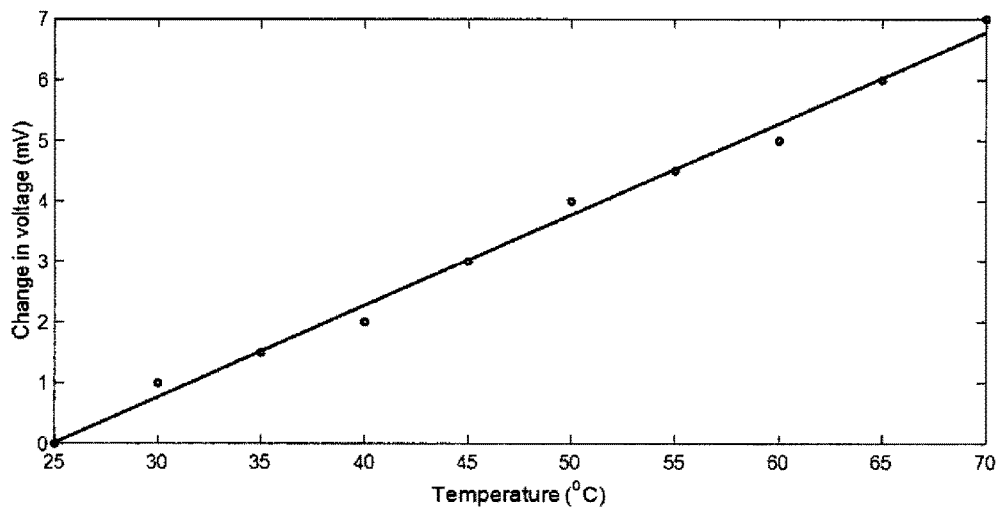
FIG. 5B shows a plot of temperature versus change in voltage measured by Photodiode 2 of the sensor of FIG. 2A.
Figure 6:
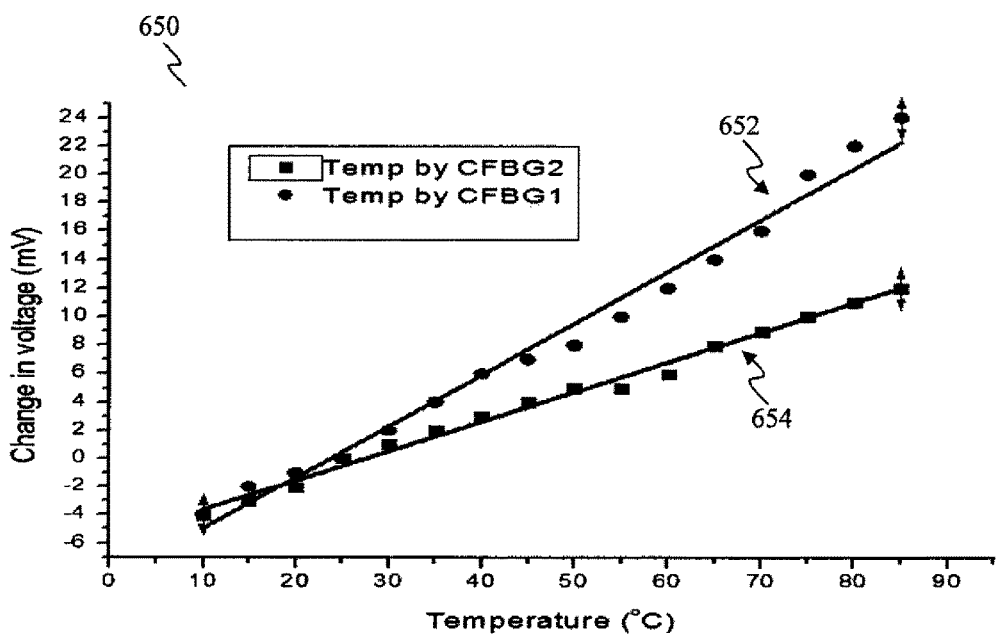
FIG. 6 shows a plot of temperature versus change in voltage measured by Photodiode 1 and Photodiode 2 of the sensor of FIG. 2A.

The spectra of CFBG2 204a, after passing through CFBG2' 204b and reaching Photodiode 2 209, corresponding to different temperature values are shown in FIG. 5A. The temperature values and the change in voltage measured by Photodiode 2 209 are plotted in FIG. 5B. It may be observed that the change in the voltage may be linearly correlated to temperature (or change thereof). Therefore, by looking at the change in the response (in terms of voltage) of Photodiode 2 209, the temperature values may be determined. Further, the temperature values and the change in voltage measured by both Photodiode 1 208 and Photodiode 2 209 are shown in FIG. 6. As may be observed from plot 650 of FIG. 6, the response (result 652) of CFBG1 202a and the response (result 654) of CFBG2 204a to temperature change are at least substantially linear.

Where both strain and temperature may vary, Photodiode 1 208 provides the combined response, while Photodiode 2 209 provides the temperature values only. In FIG. 6, the voltage change (due to temperature) in Photodiode 2 209 may be correlated to the voltage change (due to strain and temperature) in Photodiode 1 208. The voltage measured by Photodiode 2 209 may be subtracted or added accordingly to the voltage measured by Photodiode 1 208 to offset the effect of temperature change so as to get the true strain value. Accordingly, the second pair of CFBG2 204a and CFBG2' 204b may measure the temperature and may work as a temperature compensator to the pair of CFBG1 202a and CFBG1' 202b.

Temperature variation at the interrogation arms (see FIG. 2A) may present a challenging issue for the application of the chirped FBG sensing module 200, for example, the temperature variations at the interrogation arms may disturb the proper functioning of the CFBG sensing module 200. To address this issue, preferably, the interrogation arms may be kept away from the actual site (where the sensing arms are placed) of monitoring. Additionally or alternatively, to address the above-mentioned problem, the interrogation arms may be packaged in such a way that they may be made thermally isolated from their surroundings.

Referring now to the sensor 300 (FIG. 3A), the design may enable FBG sensing/interrogation system to be made smaller, compact, robust, cost-effective and consumer-friendly, which may increase the acceptability of FBG sensors in the market. FBGs may require the use of SLED light sources which are more costly, heavier and more power-hungry than the easily available low power LEDs. However, coupling light from an LED to the core of a single mode fibre (e.g., having a core diameter of about 4.4 μm) may be challenging. The light emerging from an LED has high divergence; therefore, the coupling efficiency is poor.

Figure 7A:
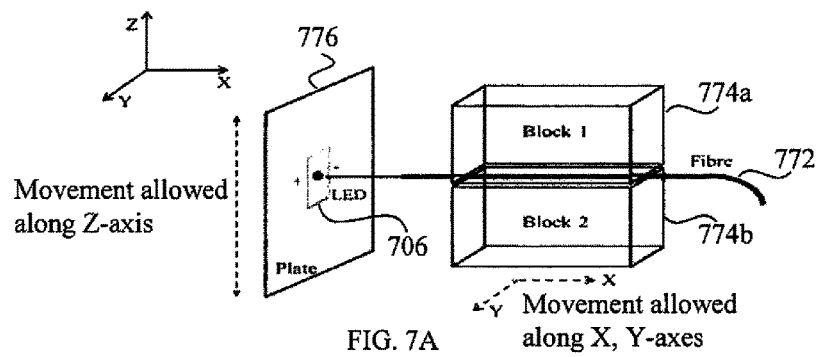
FIGS. 7A to 7C show schematic views illustrating LED to single mode (SM) fiber-core light coupling, according to various embodiments.
Figure 7B:
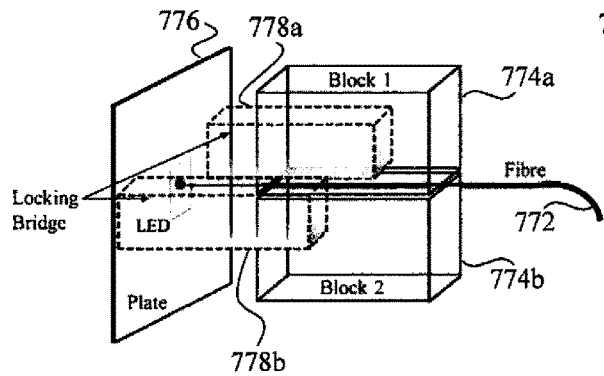
Figure 7C:
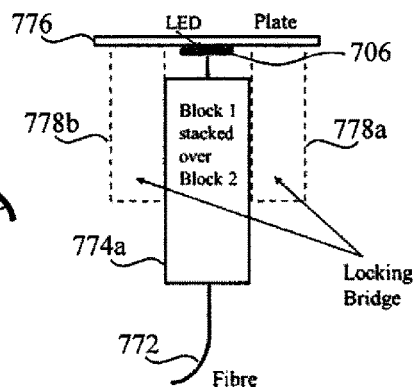

In various embodiments, an LED to fibre-core coupling setup may be prepared, as schematically shown in FIGS. 7A to 7C. FIG. 7A shows an LED-fiber alignment arrangement. A single mode fiber (e.g., 780 HP) 772 may be sandwiched between two acrylate blocks, for example, Block 1 774a and Block 2 774b. A half millimeter groove (not shown) may be carved out along the length of Block 1 774a to accommodate the fiber 772 that is glued to the groove. Block 2 774b may be glued to the bottom of Block 1 774a and, thus, the fiber 772 may be sandwiched between the two blocks 774a, 774b. The stacked acrylate blocks 774a, 774b accommodating the fiber 772 into the groove may be placed on a micrometer positioning stage which may move along the X and Y-axes. The fiber 772 may, for example, lead to the coupler 310 (FIG. 3A).

An LED 706 may be glued to a different acrylate plate 776 and the entire plate 776 may then be placed on a different micrometer positioning stage which may move along Z-axis only. The fiber 772 and the LED 706 may be aligned to have the maximum LED light launched into the fiber core by moving the fiber 770 and the LED 706 in any one or more of the X, Y and Z-directions or axes.

When the fiber 772 and the LED 706 are at least substantially optimally or perfectly aligned, two locking bridges (e.g., acrylate blocks) 778a, 778b may be glued in such a way that they hold the LED plate 776 and the fiber blocks 774a, 774b together, as shown in FIG. 7B illustrating a perspective side view of the locking method after the LED 706 and the fiber 772 are aligned to receive the maximum power from the LED 706. Hence, the entire coupling system may be locked firmly and there may be no relative movement possible. This locked coupling system may then be taken off from the positioning stages. FIG. 7C shows a bird's eye view after the LED 706 and the fiber 772 are locked together in a well-aligned position.

Figure 8A:
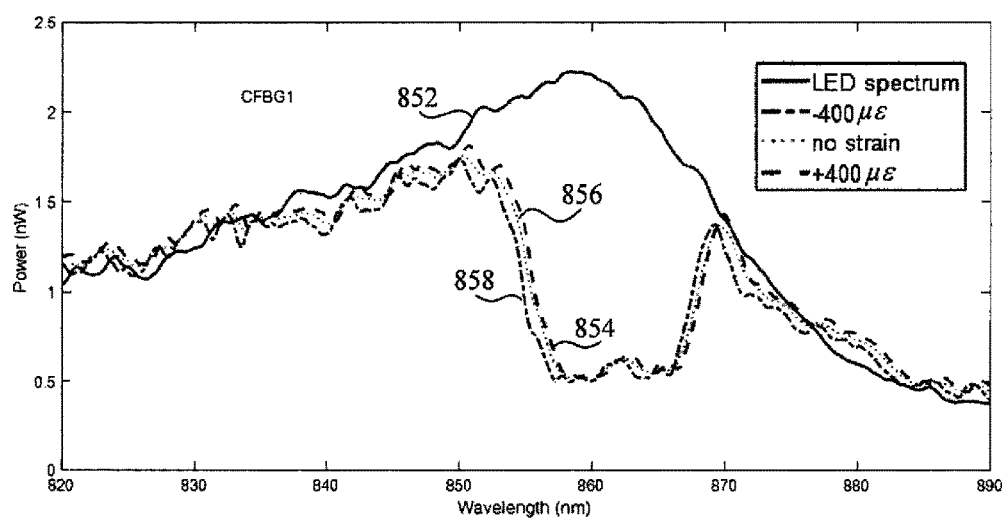
FIG. 8A shows a plot of the spectrum of the LED light source and the transmission spectra of CFBG1 at different strain values of the sensor of FIG. 3A.

The transmission spectrum 856 of CFBG1 302 (FIG. 3A) along with the LED spectrum 852 are shown in FIG. 8A. The transmission spectrum of CFBG2 304 is similar to CFBG1 302. Preferably, the bandwidth of the CFBGs 302, 304 cover the second half of the LED spectrum 856 (e.g., about 857-890 nm) for maximum sensitivity. However, due to the unavailability of such CFBGs, as non-limiting examples, lower bandwidth (e.g., 855-865 nm) CFBGs may be used. These CFBGs work in a similar fashion except the sensitivity of the sensing system may be a bit lower than for a system employing CFBGs having the bandwidth of 857-890 nm.

Tensile and compressive strains may be applied to CFBG1 302 and its transmission spectra corresponding to various strains are shown in FIG. 8A, where spectrum 854 corresponds to a tensile (positive) strain of 400με, while spectrum 858 corresponds to a compressive (negative) strain of 400με. Because of the limited bandwidth of CFBG1 302, an undesirable small peak appears in the transmission spectra 854, 856, 858 at about 870 nm.

Figure 8B:
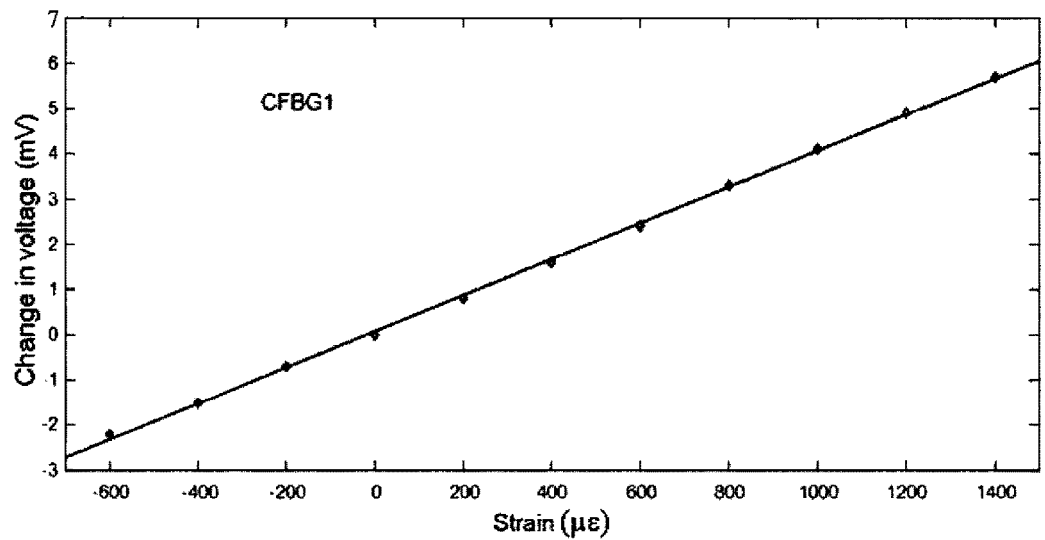
FIG. 8B shows a plot of strain versus change in voltage measured by Photodiode 1 of the sensor of FIG. 3A.

As shown in FIG. 8A, positive strain shifts the spectrum 856 of CFBG1 302 to the right to the spectrum 854, which leads to an increased amount of light going into Photodiode 1 308, while negative strain shifts the spectrum 856 of CFBG1 302 to the left to the spectrum 858, which leads to a decreased amount of light going into Photodiode 1 308. Thus, the voltage measured by Photodiode 1 308 increases or decreases on the application of positive or negative strain. The strain values and the change in voltage measured by Photodiode 1 308 are shown in FIG. 8B. It may be observed that the response of Photodiode 1 308 to different strain values (or change thereof) is at least substantially linear. Therefore, by examining the changes in the response (in terms of voltage) of Photodiode 1, the strain values may be determined. However, the presence of the small peak at about 870 nm may be counter-productive to the sensitivity of this sensing system. Therefore, CFBGs of sufficient bandwidth (e.g., 857-890 nm) preferably may be used to achieve maximum sensitivity for the sensor 300.

Figure 8C:
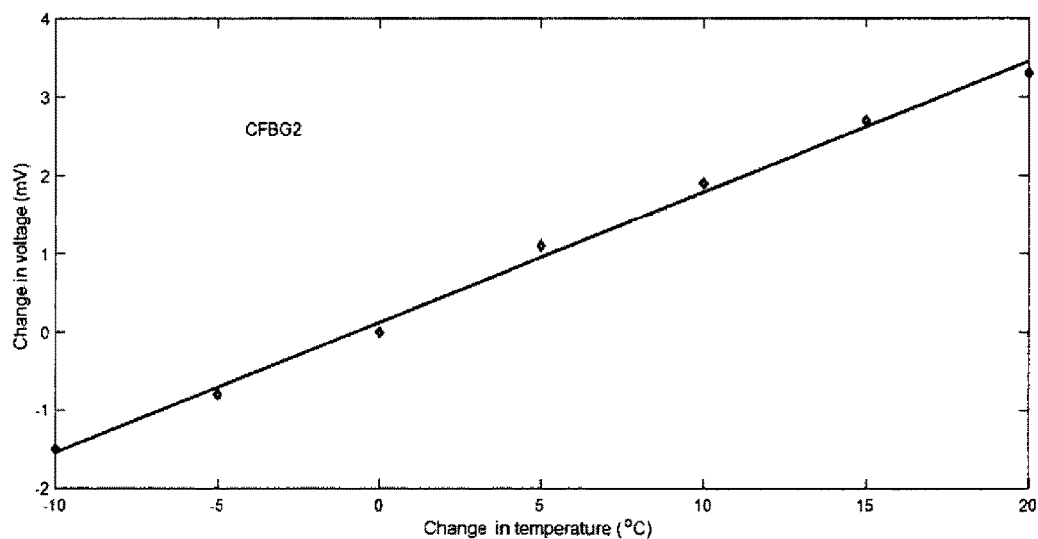
FIG. 8C shows a plot of change in temperature versus change in voltage measured by Photodiode 2 of the sensor of FIG. 3A.

In the sensing system 300, CFBG2 304 may be used for temperature measurement. The transmission spectrum of CFBG2 304 may be similar to that of CFBG1 302. The rise or fall in temperature may shift the transmission spectrum of CFBG2 302 right or left, which leads to an increased or decreased amount of light going into Photodiode 2 309. The change in temperature and the change in voltage measured by Photodiode 2 309 are shown in FIG. 8C. It may be observed that the response of Photodiode 2 309 to the change in temperature is at least substantially linear.

In various embodiments, for the sensors 200, 300, where both strain and temperature may vary, Photodiode 1 208, 308 provides the combined response; while the voltage measured by Photodiode 2 209, 309 changes purely due to temperature variation. From FIGS. 5B and 8C, the voltage change from Photodiode 2 209, 309, induced due to changes in the temperature, may be compensated to the voltage obtained from Photodiode 1 208, 308 of the sensors 200, 300, respectively, to obtain true strain measurement. Thus, the sensor designs 200, 300 may provide true strain (tensile/compressive) and temperature variations simultaneously.

Since the high power SLED light source 206 may be used in the sensor 200, its strain responsivity may be more than that of the sensor 300. The light coupled into the core of the fiber from the high power SLED 206 may be high enough to provide an input signal to multiple sensors connected in parallel, hence, multiplexing may be done. However, using a low power LED as a light source in the sensor 200 may be challenging as this may lead to a poor strain sensitivity as two fiber couplers 210, 212 may be used in the sensor 200. In the sensor design 200, a part of the reflected light from CFBG1 202a and CFBG2 204a goes into the Photodiode 1 208 and Photodiode 2 209, respectively, while the rest of the light is reflected by CFBG1' 202b and CFBG2' 204b. Therefore, in this case, the signals generated by the photodiodes 208, 209 may be likely to be more stable in the event of random variations in the SLED source 206.

On the other hand, one coupler 310 may be used in the sensor 300, therefore, usage of a low power LED 306 may allow a reasonable strain responsivity (leading to a strain resolution of about 5-10με) for the sensor 300. It may be challenging to carry out multiplexing for the sensor 300. However, the responsivity of the sensor 300 may be increased by using a highly sensitive power-meter/photodiode and/or by increasing the coupling efficiency from the LED 206 to the fiber core (e.g., refer to FIGS. 7A to 7C and the corresponding description). Using an LED rather than an SLED light source makes the sensor design 300 cheaper, less power consuming and more compact than the sensor design 200. The sensor 300 may work as a standalone unit and may run on battery.

Figure 9:
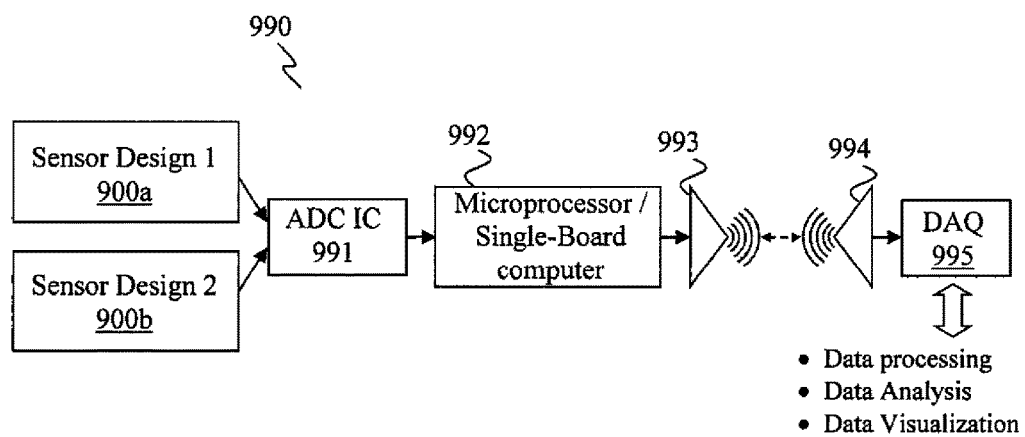
FIG. 9 shows a schematic diagram illustrating a sensing system integrated with a wireless module, according to various embodiments.

Various embodiments may provide integration of the FBG sensor or sensing system with a wireless module. FIG. 9 shows a schematic diagram illustrating a sensing system 990 integrated with a wireless module, according to various embodiments. The response of the sensor(s) or sensing system(s) 900a and/or 900b may be converted from an optical signal to an electrical signal through photodiodes (e.g., 208, 209, FIG. 2A; 308, 309, FIG. 3A). The sensor design 1 900a may be as described in the context of the sensor 200 (FIG. 2A). The sensor design 2 900b may be as described in the context of the sensor 300 (FIG. 3A). It should be appreciated that either the sensor design 1 900a, or the sensor design 2 900b, or both may be provided in the system 990.

The output from the photodiode may be fed to a wireless module, for example, via a wireless system as shown in FIG. 9. The analog signals from the photodiodes may be converted into digital signals through an Analog-to-Digital Converter (ADC) 991, e.g., a 16-bit high-precision ADC. The ADC 991 may be interfaced with a microprocessor 992 and the digital signal value may be fed into the microprocessor 992 through the ADC 991. The microprocessor 992 may process the signal value and convert it into a data packet. The data packet may include or consist of a preamble and a data payload. The preamble may include or consist of the sender information, the receiver information and the number of bytes to be transmitted and the data payload may include or consist of the sensor value in digital form. After the data packet is created, it may be transmitted wirelessly, via a wireless transmitter 993, to a receiver node, e.g., a wireless receiver 994. The receiver node 994 may be connected to a computer or a data acquisition system (DAQ) 995 that may run a graphical user interface (GUI) software. The GUI software may provide real-time visualization and analysis of the sensor data.

FBGs have attracted extensive research attention in the last 2-3 decades. They have been implemented as strain, temperature and pressure sensors for health monitoring of different civil, mechanical and aerospace structures. Still, the sentiment of the sensor market is skeptical about the implementation of FBGs. The reasons for this sentiment are simply the cost and the bulkiness of the FBG interrogation system namely, the optical spectrum analyzer (OSA). While the size of the system has been reduced, the cost is still very high and the size is not compact and small enough for field applications.

The sensor or sensing system of various embodiments abrogates the need for OSA. Various embodiments may utilize a simple LED as a light source. Altogether, this design may substantially bring down the cost and the size as they do not require an OSA or any expensive light source. No bulky component is needed in various embodiments, making the sensors compact and light in weight. Unlike many other known sensor designs, the designs of various embodiments may be capable of measuring strain in both directions, and temperature simultaneously.

Figure 10:
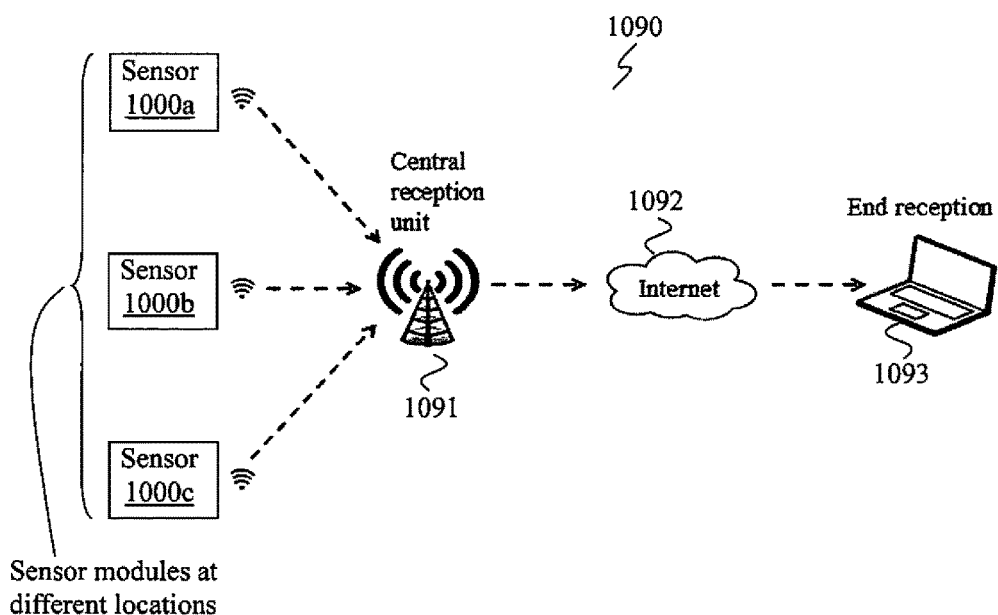
FIG. 10 shows a schematic diagram illustrating a wireless scheme for signal transmission at a remote location, according to various embodiments.

The sensing systems of various embodiments may be integrated with a wireless communication setup (e.g., wifi scheme). The photodiodes response may be transmitted wirelessly. Thus, this may allow making the system Wi-Fi for remote sensing purposes. As shown in FIG. 10, several sensors or sensing units 1000*a*, 1000*b*, 1000*c* may be provided or installed at different locations and the response of each sensor module 1000*a*, 1000*b*, 1000*c* may be transmitted to a central reception unit 1091 which may then transfer the signal, via the internet 1092, to one or more receiving nodes or end receptions (e.g., a user) 1093. Thus, the signals from different sensor modules 1000*a*, 1000*b*, 1000*c* may be received at any point in the world. It should be appreciated that any number of sensor modules may be provided, including less than three sensor modules or more than three sensor modules. Further, it should be appreciated that a respective module (e.g., 1000*a*, 1000*b*, 1000*c*) may be the sensor as described in the context of the sensor 200 (FIG. 2A) or the sensor 300 (FIG. 3A).

The sensor (or sensor module) as described herein may be complete and the whole fabrication and assembling process may be automated. This may allow the manufacturer to scale up production, thus reducing the cost per unit even further. The sensor or sensing system of various embodiments may be suitable for the following applications, including but not limited to:

(1) Energy industry: Strain/temperature monitoring of different units in the energy industry demands remote sensing capability. Various embodiments may be suitable for this purpose as the sensors may be integrated with a wireless setup. The target application areas may include the blades of floating wind turbines, power generators, transformers, etc.

(2) Transportation industry: Strain monitoring of the different parts of heavy vehicles is important. The railway overhead contact line, railway pantographs, railway tracks, some parts of cranes, etc., may require an electromagnetically insulated sensing system for monitoring. The sensing system of various embodiments may be independent of any electromagnetic interference and may be capable of performing structural health monitoring of these parts with high accuracy.

(3) Aerospace industry: Every aircraft is monitored by monitoring the strain of its various parts. Wings, hulls, etc., are some of the important parts. Here, in this case, the sensors must have the quality of embodiment. The fiber sensors of various embodiments may be embedded during the manufacturing of the aircraft part itself without affecting its structural integrity.

(4) Civil structures: To avoid catastrophic failure of civil structures such as tall buildings, bridges, flyovers etc., different structural health monitoring techniques are used. Usually, the strain at crucial points of the structures is monitored. The sensors of various embodiments may provide a better alternative to known sensors. Further, the wireless communication may make the entire monitoring process user-friendly.

(5) Oil and gas industry: The oil and gas industry is facing a challenge on how to monitor its pipelines and offshore platforms. Since the sensing system of various embodiments may be integrated with wireless capability, it may provide an easy solution to the above-mentioned problem.

As described above, various embodiments may provide a wavelength shifted CFBG interrogation system. The strain resolution of the sensor or sensing module may be as good as $1\mu\varepsilon$. The strain measurement range may be as good as $\pm 7000\mu\varepsilon$ or even more. Altogether, it may present a cost effective, compact and high-resolution sensing module. Further, the sensor may be capable of measuring positive/negative strain and temperature simultaneously. The optical intensity based CFBG interrogation system of various embodiments abrogates the need for an optical spectrum analyzer. The responses from the photodiodes may be transmitted wirelessly. Because of their simple and compact design, the sensor modules may be installed at several locations to form a sensor network and the response of each sensor module may be transmitted to a central reception unit for analysis.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An optical sensor for sensing at least one parameter comprising:
    an optical source configured to provide a source optical signal and a reference spectral profile; and
    a grating arrangement optically coupled to the optical source to receive the source optical signal, the grating arrangement comprising:
        a first chirped fiber Bragg grating (FBG) having a first defined spectral profile,
            wherein the first defined spectral profile overlaps with a portion of the reference spectral profile,
            wherein the first chirped FBG is configured, in response to a first change in the at least one parameter interacting with the first chirped FBG, to change from an original state to a first state to shift the first defined spectral profile in a first direction relative to the reference spectral profile, and further configured, in response to the first defined spectral profile being shifted in the first direction, to transmit a first portion of the source optical signal as a first output optical signal corresponding to the first change, wherein a first intensity of the first output optical signal is indicative of the first change, and
            wherein the first chirped FBG is configured, in response to a second change in the at least one parameter interacting with the first chirped FBG, to change from the original state to a second state to shift the first defined spectral profile in a second direction relative to the reference spectral profile, and further configured, in response to the first defined spectral profile being shifted in the second direction, to transmit a second portion of the source optical signal as a second output optical signal corresponding to the second change, wherein a second intensity of the second output optical signal is indicative of the second change; and
        a second chirped FBG having a second defined spectral profile,
            wherein the second defined spectral profile overlaps with a portion of the reference spectral profile,
            wherein the second chirped FBG is configured, in response to a third change in a parameter interacting with the second chirped FBG, to change from an original state to a third state to shift the second defined spectral profile in a third direction relative to the reference spectral profile, and further configured, in response to the second defined spectral profile being shifted in the third direction, to transmit a third portion of the source optical signal as a third output optical signal corresponding to the third change, wherein a third intensity of the third output optical signal is indicative of the third change, and wherein the second chirped FBG is configured, in response to a fourth change in the parameter interacting with the second chirped FBG, to change from the original state to a fourth state to shift the second defined spectral profile in a fourth direction relative to the reference spectral profile, and further configured, in response to the second defined spectral profile being shifted in the fourth direction, to transmit a fourth portion of the source optical signal as a fourth output optical signal corresponding to the fourth change, wherein a fourth intensity of the fourth output optical signal is indicative of the fourth change.

2. The optical sensor as claimed in claim 1, further comprising a photodetector configured to receive the first output optical signal and the second output optical signal.

3. The optical sensor as claimed in claim 2, further comprising a second photodetector configured to receive the third output optical signal and the fourth output optical signal.

4. The optical sensor as claimed in claim 1, wherein the optical source comprises a superluminescent diode or a light emitting diode.

5. The optical sensor as claimed in claim 1, further comprising at least one fiber coupler arranged to optically couple the optical source to the grating arrangement.

6. The optical sensor as claimed in claim 1, further comprising a wireless module.

7. A sensor arrangement comprising:
a plurality of optical sensors, wherein at least one optical sensor of the plurality of optical sensors is as claimed in claim 6; and
a wireless communication unit configured to communicate with the wireless module.

8. The optical sensor as claimed in claim 1, further comprising a processor.

9. A sensor arrangement comprising a plurality of optical sensors, wherein at least one optical sensor of the plurality of optical sensors is as claimed in claim 1.

10. An optical sensor for sensing at least one parameter comprising:
an optical source configured to provide a source optical signal and a reference spectral profile; and
a grating arrangement optically coupled to the optical source to receive the source optical signal, the grating arrangement comprising:
a first chirped fiber Bragg grating (FBG) having a first defined spectral profile, wherein the first defined spectral profile overlaps with a portion of the reference spectral profile, wherein the first chirped FBG is configured, in response to a first change in the at least one parameter interacting with the first chirped FBG, to change from an original state to a first state to shift the first defined spectral profile in a first direction relative to the reference spectral profile, and further configured, in response to the first defined spectral profile being shifted in the first direction, to transmit a first portion of the source optical signal as a first output optical signal corresponding to the first change, and wherein the first chirped FBG is configured, in response to a second change in the at least one parameter interacting with the first chirped FBG, to change from the original state to a second state to shift the first defined spectral profile in a second direction relative to the reference spectral profile, and further configured, in response to the first defined spectral profile being shifted in the second direction, to transmit a second portion of the source optical signal as a second output optical signal corresponding to the second change; and a second chirped FBG having a second defined spectral profile, wherein the second defined spectral profile overlaps with a portion of the reference spectral profile, wherein the second chirped FBG is configured, in response to a third change in a parameter interacting with the second chirped FBG, to change from an original state to a third state to shift the second defined spectral profile in a third direction relative to the reference spectral profile, and further configured, in response to the second defined spectral profile being shifted in the third direction, to transmit a third portion of the source optical signal as a third output optical signal corresponding to the third change, and wherein the second chirped FBG is configured, in response to a fourth change in the parameter interacting with the second chirped FBG, to change from the original state to a fourth state to shift the second defined spectral profile in a fourth direction relative to the reference spectral profile, and further configured, in response to the second defined spectral profile being shifted in the fourth direction, to transmit a fourth portion of the source optical signal as a fourth output optical signal corresponding to the fourth change.

11. The optical sensor as claimed in claim 10, further comprising:
a first photodetector configured to receive the first output optical signal and the second output optical signal, and
a second photodetector configured to receive the third output optical signal and the fourth output optical signal.

12. A sensor arrangement comprising a plurality of optical sensors, wherein at least one optical sensor of the plurality of optical sensors is as claimed in claim 10.

* * * * *